US008780994B2

(12) United States Patent
Kotaka et al.

(10) Patent No.: US 8,780,994 B2
(45) Date of Patent: Jul. 15, 2014

(54) APPARATUS, METHOD, AND COMPUTER PROGRAM FOR IMAGE ENCODING WITH INTRA-MODE PREDICTION

(75) Inventors: Naohiko Kotaka, Tokyo (JP); Munehiro Nakazato, Park Ridge, NJ (US)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 12/709,701

(22) Filed: Feb. 22, 2010

(65) Prior Publication Data

US 2010/0260263 A1 Oct. 14, 2010

(30) Foreign Application Priority Data

Apr. 14, 2009 (JP) ................................ 2009-097826

(51) Int. Cl.
*H04N 7/12* (2006.01)
*H04N 7/26* (2006.01)
*H04N 7/36* (2006.01)

(52) U.S. Cl.
CPC .... *H04N 19/00175* (2013.01); *H04N 19/00672* (2013.01)
USPC ..................................................... 375/240.24

(58) Field of Classification Search
CPC .................. H04N 19/00175; H04N 19/00672
USPC ..................................................... 375/240.24
See application file for complete search history.

(56) References Cited

U.S. PATENT DOCUMENTS

2006/0126730 A1* 6/2006 Arakawa et al. ......... 375/240.03
2009/0268974 A1* 10/2009 Takagi ......................... 382/238

FOREIGN PATENT DOCUMENTS

JP 2007-150913 6/2007

OTHER PUBLICATIONS

U.S. Appl. No. 12/732,513, filed Mar. 26, 2010, Kotaka, et al.

* cited by examiner

*Primary Examiner* — Richard Torrente
(74) *Attorney, Agent, or Firm* — Oblon, Spivak, McClelland, Maier & Neustadt, L.L.P.

(57) ABSTRACT

An image encoding apparatus includes: a prediction preparing section which prepares a prediction for each intra-prediction mode by using at least ones of pixel signals of pixels lined horizontally in an upper end of an encoding target block and pixel signals of pixels lined vertically in a left end of the encoding target block among pixel signals of the encoding target block; and a prediction mode derivation section which execute an intra-prediction operation by using an image of the encoding target block in an encoding target image and the prediction prepared by the prediction preparing section.

9 Claims, 14 Drawing Sheets

10
11
A/D
12
+
−
13
ORTHOGONAL TRANSFORM UNIT
14
QUANTIZATION UNIT
15
REVERSIBLE ENCODING UNIT
16
STORAGE BUFFER
17
RATE CONTROLLER
21
INVERSE QUANTIZATION UNIT
22
INVERSE ORTHOGONAL TRANSFORM UNIT
23
24
DE-BLOCK FILTER
25
FRAME MEMORY
31
INTRA-PREDICTION BUFFER
32
INTRA-PREDICTION UNIT

FIG. 3

| M | A | B | C | D | E | F | G | H |
| --- | --- | --- | --- | --- | --- | --- | --- | --- |
| I | a | b | c | d | e | f | g | h |
| J | j | | | | | | | |
| K | k | | | | | | | |
| L | l | | | | | | | |

FIG. 4A

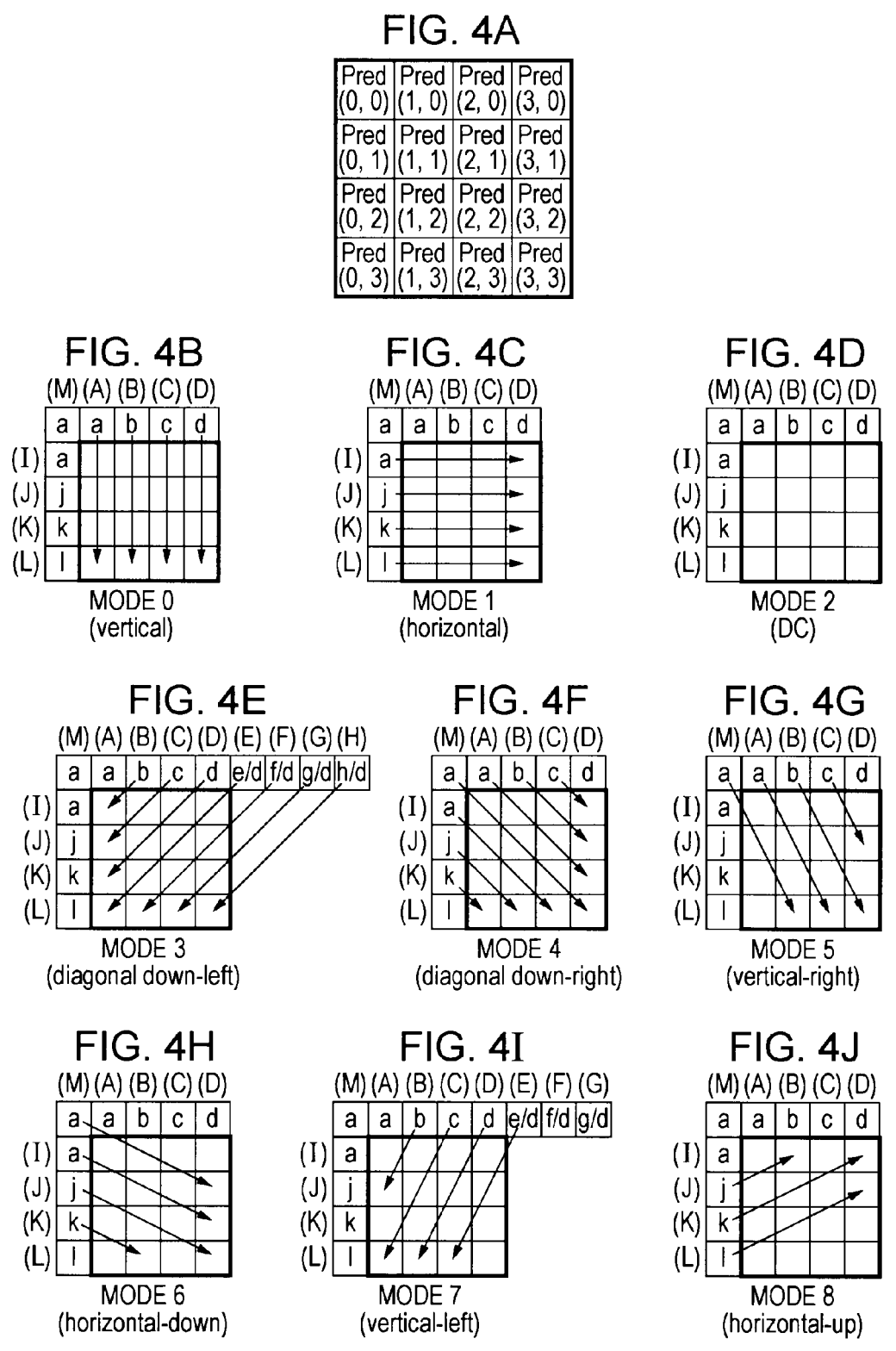

| Pred (0, 0) | Pred (1, 0) | Pred (2, 0) | Pred (3, 0) |
|---|---|---|---|
| Pred (0, 1) | Pred (1, 1) | Pred (2, 1) | Pred (3, 1) |
| Pred (0, 2) | Pred (1, 2) | Pred (2, 2) | Pred (3, 2) |
| Pred (0, 3) | Pred (1, 3) | Pred (2, 3) | Pred (3, 3) |

FIG. 4B

MODE 0 (vertical)

FIG. 4C

MODE 1 (horizontal)

FIG. 4D

MODE 2 (DC)

FIG. 4E

MODE 3 (diagonal down-left)

FIG. 4F

MODE 4 (diagonal down-right)

FIG. 4G

MODE 5 (vertical-right)

FIG. 4H

MODE 6 (horizontal-down)

FIG. 4I

MODE 7 (vertical-left)

FIG. 4J

MODE 8 (horizontal-up)

PIXEL IN ENCODING TARGET BLOCK

PIXEL IN ENCODING TARGET BLOCK

PIXEL ADJACENT TO ENCODING TARGET BLOCK

FIG. 8A

| 0 | 1 | 4 | 5 |
|---|---|---|---|
| 2 | 3 | 6 | 7 |
| 8 | 9 | 12 | 13 |
| 10 | 11 | 14 | 15 |

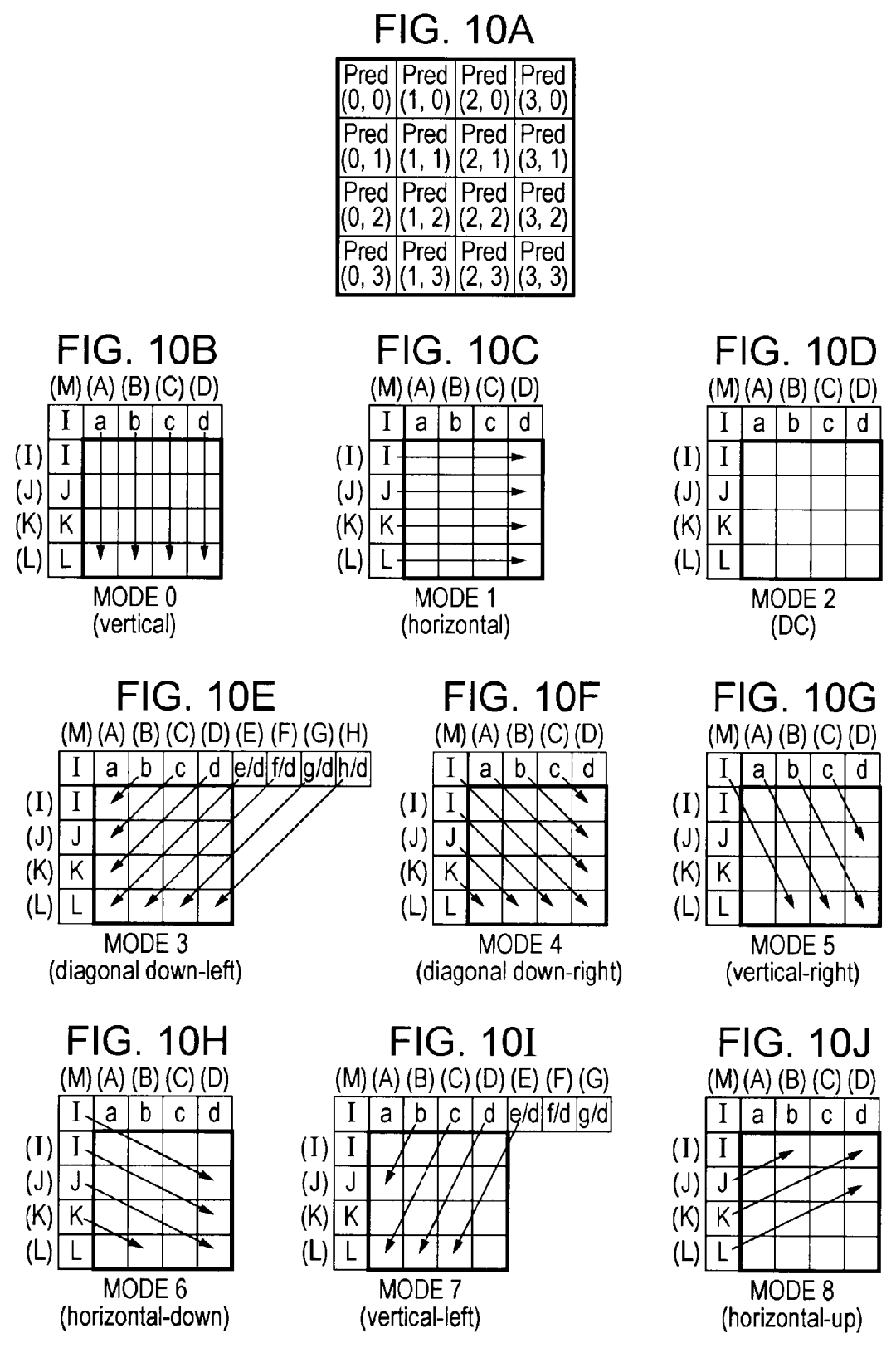

| Pred (0, 0) | Pred (1, 0) | Pred (2, 0) | Pred (3, 0) |
|---|---|---|---|
| Pred (0, 1) | Pred (1, 1) | Pred (2, 1) | Pred (3, 1) |
| Pred (0, 2) | Pred (1, 2) | Pred (2, 2) | Pred (3, 2) |
| Pred (0, 3) | Pred (1, 3) | Pred (2, 3) | Pred (3, 3) |

FIG. 10B

MODE 0 (vertical)

FIG. 10C

MODE 1 (horizontal)

FIG. 10D

MODE 2 (DC)

FIG. 10E

MODE 3 (diagonal down-left)

FIG. 10F

MODE 4 (diagonal down-right)

FIG. 10G

MODE 5 (vertical-right)

FIG. 10H

MODE 6 (horizontal-down)

FIG. 10I

MODE 7 (vertical-left)

FIG. 10J

MODE 8 (horizontal-up)

60
61
CPU
62
ROM
63
RAM
64
65
INPUT/OUTPUT INTERFACE
66
INPUT UNIT
67
OUTPUT UNIT
68
RECORD UNIT
69
COMMUNICATION UNIT
70
DRIVE
72
REMOVABLE MEDIA

APPARATUS, METHOD, AND COMPUTER PROGRAM FOR IMAGE ENCODING WITH INTRA-MODE PREDICTION

BACKGROUND OF THE INVENTION

1. Field of the Invention

The present invention relates to an image encoding apparatus, an image encoding method, and a computer program, and more particularly, to a technique capable of executing an intra-prediction operation at a high speed with a simple configuration in image encoding.

2. Description of the Related Art

In the past, a technique capable of transmitting and accumulating image signals effectively by using the redundancy of the image signal efficiently was developed, when a video for broadcast is transmitted and recorded, for example. This technique executes data compression of an image signal by motion compensation and orthogonal transform such as discrete cosine transform in conformity with the MPEG (Moving Picture Experts Group) or the like.

For example, the MPEG2 (ISO/IEC 13818-2) is a method that is defined as a general image encoding method. This method is defined so as to correspond to both an interlacing scanning method and a progressive scanning method and so as to correspond to both a standard resolution image and a high-definition image. The MPEG2 is widely used in various applications.

A standard encoding method ensuring a higher encoding efficiency than that of the MPEG2 has been developed as the Joint Model of Enhanced-Compression Video Coding method and standardized as the H.264/MPEG-4 AVC (ITU-T Rec.H.264 ISO/IEC 14496-10 AVC).

In this kind of encoding method, an in-image prediction operation (intra-prediction operation) and an inter-image prediction operation (inter-prediction operation) are executed. For example, Japanese Unexamined Patent Application Publication No. 2007-150913 discloses a method of storing at least ones of pixel signals of an original image vertically adjacent to the left side of an encoding target block (encoding target block) and pixel signals of the original image adjacent horizontally on the upper side of the intra-prediction target block. The method is disclosed such that the intra-prediction operation is executed with a smaller cycle number by using the stored pixel signals and pixel signals of a block (encoded block) of an image encoded by encoding and decoding.

SUMMARY OF THE INVENTION

However, when the pixel signals of the original image and the pixel signal of the encoded block, as in Japanese Unexamined Patent Application Publication No. 2007-150913, a prediction is prepared or encoding cost is calculated in each intra-prediction mode in an intra-prediction operation by storing the pixel signals and using the stored pixel signals. Therefore, in order to store the pixel signals with a high resolution of an encoding image, a large capacity of memory is necessary. For example, when an image signal of an encoding target image (original image) has the YUV420 format and a resolution of 1920 pixels×1080 lines, the pixel signal of pixels lined horizontally in the lower end portion of adjacent blocks has a signal amount corresponding to 3840 pixels (Y=1920 pixels, Cb=960 pixels, and Cr=960 pixels). For this reason, when the encoding target image is divided into macroblock units to execute an intra-prediction operation in order of raster scan, it is necessary to store a pixel signal corresponding to 3840 pixels.

It is desirable to provide an image encoding apparatus, an image encoding method, and a computer program executing an intra-prediction operation with a simple configuration.

According to an embodiment of the invention, there is provided an image encoding apparatus including: a prediction preparing section which prepares a prediction for each intra-prediction mode by using at least ones of pixel signals of pixels lined horizontally in an upper end of an encoding target block and pixel signals of pixels lined vertically in a left end of the encoding target block among pixel signals of the encoding target block; and a prediction mode derivation section which executes an intra-prediction operation of the encoding target block by using an image of the encoding target block in an encoding target image and the prediction prepared by the prediction preparing section.

According to the embodiment of the invention, the prediction is prepared using at least ones of the pixel signals of the pixels lined horizontally in the upper end of the encoding target block and the pixel signals of the pixels lined vertically in the left end of the encoding target block among the pixel signals of the encoding target block in the encoding target image. When the pixel signals in the upper end of the encoding target block or the pixel signals in the left end of the encoding target block are used, the prediction for each intra-prediction mode is prepared using the pixel signals and pixel signals adjacent to the encoding target block in the encoding target image. For example, when the direction of the processing order of the macroblock is horizontal, the prediction is prepared using the pixel signals of the pixels lined horizontally in the upper end of the encoding target block and the pixel signals of the pixels lined vertically in the right end of the block adjacent to the left side of the encoding target block in the encoding target image from the encoding target image. When the direction of the processing order of the macroblock is vertical, the prediction is prepared using the pixel signals of the pixels lined vertically in the left end of the encoding target block and the pixel signals of the pixels lined horizontally in the lower end of the block adjacent to the upper side of the encoding target block in the encoding target image from the encoding target image. The encoding cost of each intra-prediction mode is calculated using the encoding target image of the encoding target block and the encoded image, and an intra-prediction mode with the smallest encoding cost is determined as an intra-prediction mode of the encoding target block.

According to another embodiment of the invention, there is provided an image encoding method including the steps of: preparing a prediction for each intra-prediction mode by using at least ones of pixel signals of pixels lined horizontally in an upper end of an encoding target block and pixel signals of pixels lined vertically in a left end of the encoding target block among pixel signals of the encoding target block by a prediction preparing section; and executing an intra-prediction operation of the encoding target block by using an image of the encoding target block in an encoding target image and the prediction prepared by the prediction preparing section by a prediction mode derivation section.

According to still another embodiment of the invention, there is provided a computer program causing a computer to execute: a function of preparing a prediction for each intra-prediction mode by using at least ones of pixel signals of pixels lined horizontally in an upper end of an encoding target block and pixel signals of pixels lined vertically in a left end of the encoding target block among pixel signals of the encoding target block; and a function of executing an intra-prediction operation of the encoding target block by using an image of the encoding target block in an encoding target image and the prepared prediction.

The computer program according to the embodiment of the invention is a computer program that may be supplied to a general computer system, which executes various program codes, in a computer readable format by a storage medium such as an optical disk, a magnetic disk, or a semiconductor memory, or a communication medium such as a network. By supplying the program in a computer readable format, a process is executed on the computer system in accordance with the program.

According to the embodiment of the invention, the prediction is prepared for each intra-prediction mode by using at least ones of the pixel signals of the pixels lined horizontally in the upper end of the encoding target block and the pixel signals of the pixels lined vertically in the left end of the encoding target block among the pixel signals in the encoding target block. Moreover, the intra-prediction operation can be executed using the prepared prediction and the image of the encoding target block. Accordingly, since the signal amount of the pixel signals stored to prepare the prediction can be reduced upon executing the intra-prediction operation, the intra-prediction operation can be executed with a simple configuration.

BRIEF DESCRIPTION OF THE DRAWINGS

FIG. 3 is a diagram illustrating a positional relationship of the pixel signals in the intra-prediction operation.

FIGS. 4A to 4J are diagrams illustrating a 4 by 4 intra-prediction mode.

FIGS. 8A to 8C are diagrams illustrating processing time.

FIGS. 10A to 10J are diagrams illustrating a 4 by 4 intra-prediction mode.

DESCRIPTION OF THE PREFERRED EMBODIMENTS

Hereinafter, a preferred embodiment of the invention will be described in the following order.

1. Configuration of Image Processing Apparatus
2. Optimum Mode Selecting Operation in Image Processing Apparatus
3. First configuration of Intra-Prediction Buffer and Intra-Prediction Unit
4. Intra-Prediction Operation
5. Second configuration of Intra-Prediction Buffer and Intra-Prediction Unit
6. Intra-Prediction Operation
7. Another Intra-Prediction Operation
8. Direction of Process Order of Macro Block and Intra-Prediction Operation
9. Case of Executing Image Encoding by Software 1. Configuration of Image Processing Apparatus An image encoding apparatus according to an embodiment of the invention prepares a prediction for each intra-prediction mode by using at least ones of pixel signals of the upper end of an encoding target block and pixel signals of the left end of the encoding target block among pixel signals in the encoding target block. The image encoding apparatus executes an intra-prediction operation on the encoding target block by using the prepared prediction and an image of the encoding target block in an encoding target image.

Figure 1:
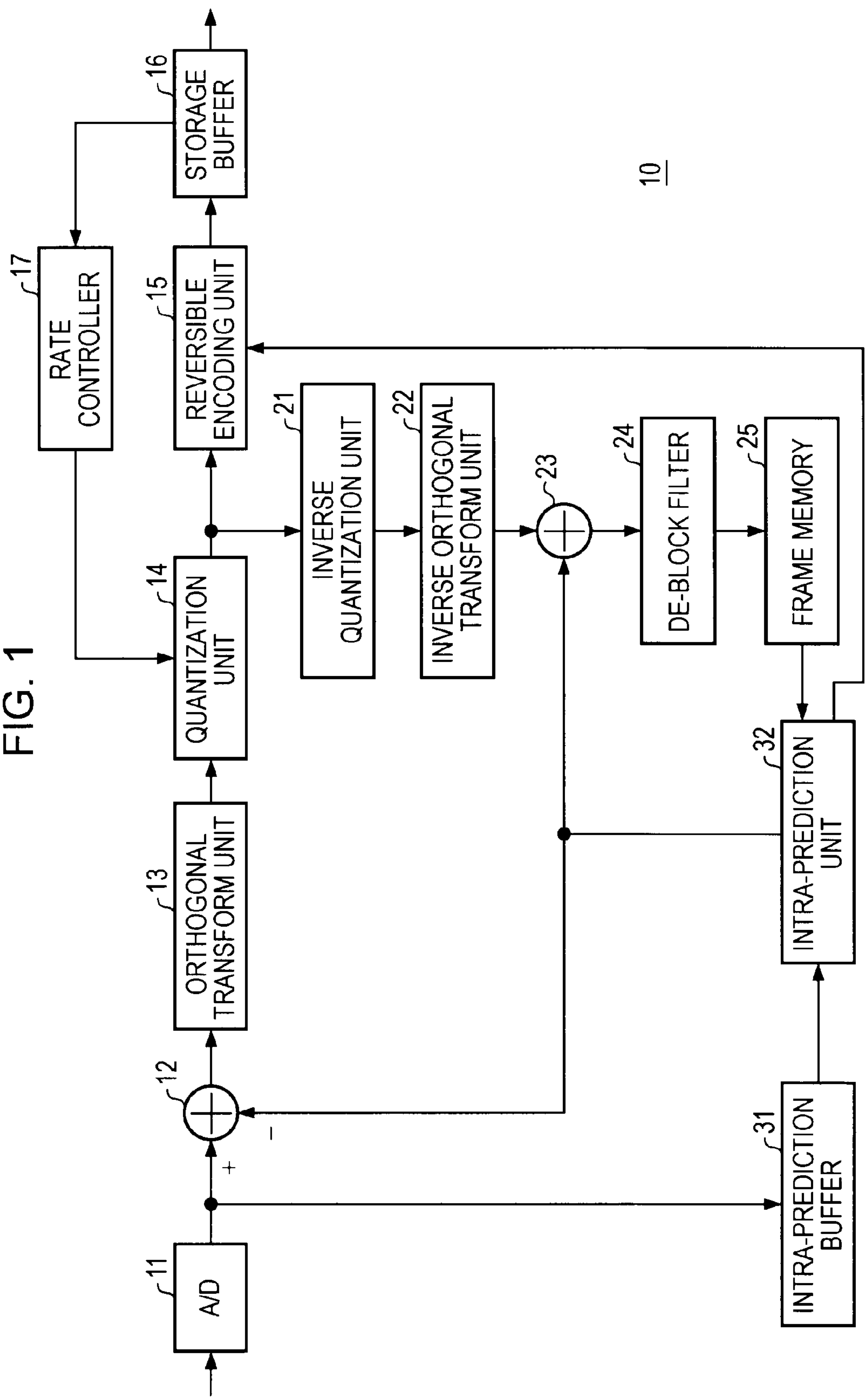
FIG. 1 is a diagram illustrating the configuration of an image encoding apparatus.

FIG. 1 is a diagram illustrating the configuration of the image encoding apparatus. The image encoding apparatus 10 includes an analog/digital converter (A/D converter) 11, a subtraction unit 12, an orthogonal transform unit 13, a quantization unit 14, a reversible encoding unit 15, a storage buffer 16, and a rate controller 17. The image encoding apparatus 10 also includes an inverse quantization unit 21, an inverse orthogonal transform unit 22, an addition unit 23, a de-block filter 24, a frame memory 25, an intra-prediction buffer 31, and an intra-prediction unit 32.

The A/D converter 11 converts an analog image signal into a digital image signal to output the digital image signal to the subtraction unit 12 and the intra-prediction buffer 31.

An image signal output from the A/D converter 11 and an image signal indicating the prediction prepared in the intra-prediction unit 32, which is described below, are supplied to the subtraction unit 12. In an intra-encoding operation, the subtraction unit 12 generates and outputs a difference signal indicating a difference between an image signal output from the A/D converter 11 and an image signal indicating the prediction prepared by the intra-prediction unit 32.

The orthogonal transform unit 13 executes an orthogonal transform process, such as a discrete cosine transform (DCT) or Karhunen-Loeve transform, on the difference signal output from the subtraction 12. The orthogonal transform unit 13 outputs a transform coefficient signal obtained by executing the orthogonal transform process to the quantization unit 14.

The transform coefficient signal output from the orthogonal transform unit 13 and a rate control signal output from the rate controller 17, which is described below, are supplied to the quantization unit 14. The quantization unit 14 executes quantization of the transform coefficient signal and outputs the quantization signal to the reversible encoding unit 15 and the inverse quantization unit 21. The quantization unit 14 converts a quantization parameter (for example, a quantization scale) on the basis of the rate control signal from the rate controller 17 to change a bit rate of the quantization signal.

The quantization signal output from the quantization unit 14 and encoding information output from the intra-prediction unit 32, which is described below, are supplied to the reversible encoding unit 15. The reversible encoding unit 15 executes a reversible encoding operation on the quantization signal by a variable length encoding or arithmetic encoding operation, for example. The reversible encoding unit 15 output the encoding information output from the intra-prediction unit 32 to the storage buffer 16 by adding the encoding information as header information to the output signal subjected to the reversible encoding operation.

The storage buffer 16 stores the output signal from the reversible encoding unit 15. The storage buffer 16 outputs the stored output signal at a transmission rate that is appropriate to the transmission line.

The rate controller 17 detects the free space of the storage buffer 16 and generates a rate control signal depending on the free space to output the rate control signal to the quantization unit 14. The rate controller 17 acquires information indicating the free space from the storage buffer 16, for example. The rate controller 17 decreases the bit rate of the quantization signal in accordance with the rate control signal, when the free space is reduced. The rate controller 17 increases the bit rate of the quantization signal in accordance with the rate control signal, when the free space of the storage buffer 16 is sufficiently large.

The inverse quantization unit 21 executes an inverse quantization operation of the quantization signal supplied from the quantization unit 14. The inverse quantization unit 21 outputs the transform coefficient signal obtained by the inverse quantization operation to the inverse orthogonal transform unit 22.

The inverse orthogonal transform unit 22 executes an inverse orthogonal transform operation of the transform coefficient signal supplied from the inverse quantization unit 21. The inverse orthogonal transform unit 22 generates the difference signal to be input to the orthogonal transform unit 13 and outputs the generated difference signal to the addition unit 23.

The difference signal from the inverse orthogonal transform unit 22 and a prediction value from the intra-prediction unit 32 are supplied to the addition unit 23. The addition unit 23 adds the prediction value and the difference signal to generate a decoding image signal and output the decoding image signal to the de-block filter 24.

The de-block filter 24 is a filter that reduces block distortion occurring when an image is encoded. The de-block filter 24 executes a filter operation to remove the block distortion adaptively from the decoding image signal supplied from the addition unit 23 and outputs the decoding image signal subjected to the filter operation to the frame memory 25.

The frame memory 25 maintains the decoding image signal supplied from the de-block filter 24. That is, the frame memory 25 maintains an encoded image obtained by the encoding and the decoding operations.

The intra-prediction buffer 31 maintains an image of the encoding target block in the encoding target image.

The intra-prediction unit 32 prepares a prediction by using the image signal in the encoding target block. The intra-prediction unit 32 prepares the prediction by using at least ones of a pixel signals of pixels lined horizontally in the upper end of the encoding target block and pixel signals of pixels lined vertically in the left end of the encoding target block among pixel signals in the encoding target block. The intra-prediction unit 32 outputs the prepared prediction to the subtraction unit 12 and the addition unit 23. Here, the intra-prediction unit 32 uses pixel signals of the encoding target image (original image) and pixel signals of the encoded image obtained by the encoding and the decoding operations as the pixel signal in the encoding target block.

The intra-prediction unit 32 determines an intra-prediction mode that is the most appropriate for each encoding target block by using the encoding target image of the encoding target block and the encoded image. The intra-prediction unit 32 prepares the prediction in the determined intra-prediction mode and outputs the image signal indicating the prediction to the subtraction unit 12.

FIG. 1 shows the configuration of the intra-prediction unit 32 in which the decoding image signal subjected to the filter operation by the de-block filter 24 is used. However, the intra-prediction operation may be executed using an image signal before the de-block filter 24 executes the filter operation.

2. Optimum Mode Selecting Operation in Image Processing Apparatus

In the H.264/AVC, a high complexity mode and a low complexity mode are defined by the Joint Model (AVC reference encoding mode). The high complexity mode is a mode for a multi-pass encoding and the low complexity mode a mode for a single-pass encoding.

In the low complexity mode, a cost function representing an encoding efficiency is defined by Expression 1 and the most optimum prediction mode is derived using the cost function by comparing costs (cost values) calculated in each prediction mode.

Expression 1

$$\text{Cost(mode)}=SA(T)D+SA(T)D0 \tag{1}$$

An SA(T)D (Sum of Absolute Transformed Difference) is an error value between the original image and a prediction image. The absolute error sum of differences in pixels values between the original image and the prediction image is applied.

An SA(T)D0 is an offset value given in the error value SA(T)D. The SA(T)D is determined by a header bit and a cost which is a weight in mode determination. The SA(T)D represents a signal amount which is supplied in the transmission of additive information such a motion vector. Specifically, an absolute value error sum SAD (Sum of Absolute Difference) is calculated for each encoding target block by Expression 2. A difference value between the original image and the prediction image in each prediction mode is applied.

Expression 2

$$SAD=\sum_{i=0}^{15}\sum_{j=0}^{15}|Org(i,j)-Pred(\text{Mode},i,j)| \tag{2}$$

Instead of the absolute value error sum SAD calculated by Expression 2, SA(T)D (mode) may be used as a difference addition value calculated by Expression 3.

Expression 3

$$SA(T)D(\text{mode})=\sum_{i=0}^{15}\sum_{j=0}^{15}|\text{Hadamard}(Org(i,j)-Pred(\text{Mode},i,j))| \tag{3}$$

Hadamard( ) represents a Hadamard transform operation obtained by multiplying a target matrix by the Hadamard transform matrix, as expressed in Expression 4.

Expression 4

$$\text{Hadamard}(A)=H^TAT \tag{4}$$

The Hadamard transform matrix is denoted as Expression 5. $H^T$ is a transposed matrix of the Hadamard transform matrix.

Expression 5

$$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (5)$$

The offset value SA(T)D0 is denoted as Expression 6 in a forward prediction mode.

Expression 6

$$SA(T)D0=QP0(QP)\cdot(2\times\text{code\_number\_of\_ref\_idx\_fwd}+\text{Bit\_to\_code\_}MVDFW) \quad (6)$$

In this expression, QP0 (QP) is a function that transforms a quantization parameter QP into a quantization scale. MVDFW is a motion vector associated with the forward prediction. Bit_to_code is an encoding amount on a bit stream associated with the motion vector.

The offset value SA(T)D0 is denoted as Expression 7 in a backward prediction mode. In this expression, MVDBW is a motion vector associated with the backward prediction.

Expression 7

$$SA(T)D0=QP0(QP)\times\text{Bit\_to\_code\_}MVDBW \quad (7)$$

The offset value SA(T)D0 is also denoted as Expression 8 in a bi-directional prediction mode.

Expression 8

$$SA(T)D0 = QP0(QP)\cdot(2\times\text{code\_number\_of\_ref\_idx\_fwd}+\text{Bit\_to\_code\_forward\_Blk\_size}+\text{Bit\_to\_code\_backword\_Blk\_size}+\text{Bit\_to\_code\_MVDFW}+\text{Bit\_to\_code\_MVDBW}) \quad (8)$$

In this expression, "Bit_to_code_forward_Blk_size" and "Bit_to_code_backward_Blk_size" are encoding amounts on a bit stream necessary for transmission of information regarding a motion compensation block associated with the forward prediction and the backward prediction, respectively.

In a direct mode, the offset value SA(T)D0 is denoted as Expression 9.

Expression 9

$$SA(T)D0=-16\times QP0(QP) \quad (9)$$

In an intra 4 by 4 prediction mode, the offset value SA(T)D0 is denoted as Expression 10.

Expression 10

$$SA(T)D0=24\times QP0(QP) \quad (10)$$

This cost function is applied in search of the motion vector. As shown Expression 11, a motion vector a motion vector with the smallest cost value is detected.

Expression 11

$$\text{Cost}=SA(T)D+SA(T)D0$$

$$SA(T)D0=QP0(QP)\cdot(\text{Bits\_to\_code\_vector}+2\times\text{code\_number\_of\_ref\_index\_fwd}) \quad (11)$$

Accordingly, when an optimum mode is detected in the low complexity mode, the intra-prediction unit 32 of the image encoding apparatus 10 calculates the cost values of all prediction modes in the intra-encoding operation. The prediction mode with the smallest cost value is determined as an intra-prediction mode.

The intra-prediction unit 32 may execute the encoding operation in the high complexity mode. In this case, in order to optimize the bit rate-distortion, a function of Expression 12 is used as a cost function representing the encoding efficiency. The intra-prediction unit 32 detects the most appropriate prediction mode by comparing the cost values calculated in each prediction mode by the cost function. In Expression 12, "D" is an error (a square error or an absolute value error) occurring in the encoding operation, "R" is an occurrence encoding amount, and "λ" is a Lagrangian multiplier.

Expression 12

$$\text{Cost}=D+R\cdot\lambda \quad (12)$$

3. First Configuration of Intra-Prediction Buffer and Intra-Prediction Unit

Figure 2:
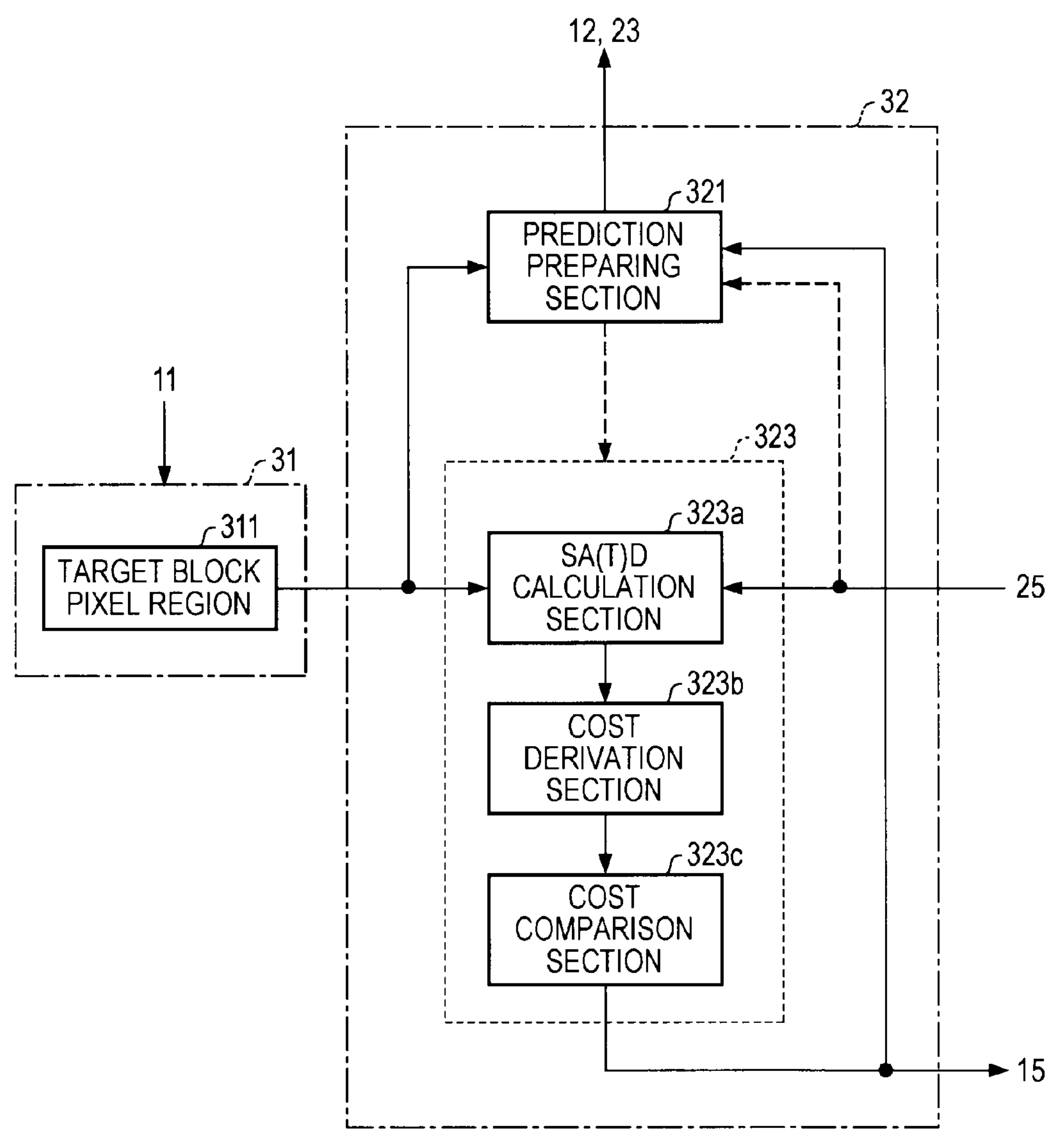
FIG. 2 is a diagram illustrating a first configuration of an intra-prediction buffer and an intra-prediction unit.

FIG. 2 is a diagram illustrating the configuration of the intra-prediction buffer and the intra-prediction unit. In the following description, a case where the encoding operation is executed in the low complexity mode will be described. Pixel signals of the encoding target image are used as pixel signals of the encoding target block.

The intra-prediction buffer 31 has a target block pixel region 311 storing the image signal of the encoding target block.

The intra-prediction unit 32 includes a prediction preparing section 321 and a prediction mode derivation section 323.

The prediction preparing section 321 prepares a prediction in each intra-prediction mode by using the image signal of the encoding target block stored in the intra-prediction buffer 31, and outputs the prepared prediction to the subtraction unit 12 and the addition unit 23.

The prediction mode derivation section 323 includes an SA(T)D calculation section 323*a*, a cost derivation section 323*b*, and a cost comparison section 323*c*.

The SA(T)D calculation section 323*a* calculates the SA(T)D and the SA(T)D0 by using the pixel signal of the encoding target image and the pixel signal of an encoded image for the encoding target block. The SA(T)D calculation section 323*a* outputs the calculated SA(T)D and SA(T)D0 to the cost derivation section 323*b*. The SA(T)D calculation section 323*a* calculates the SA(T)D and the SA(T)D0 for each block in each intra-prediction mode by using Expressions 2 and 10.

The cost derivation section 323*b* executes calculation of Expression 1 using the SA(T)D and the SA(T)D0 supplied from the SA(T)D calculation section 323*a*, calculates the cost values, and outputs the cost values to the cost comparison section 323*c*. The cost derivation section 323*b* calculates the cost value for each block in each intra-prediction mode.

The cost comparison section 323*c* compares the cost values calculated by the cost derivation section 323*b* in each intra-prediction mode. Then, the cost comparison section 323*c* determines the prediction mode with the smallest cost value as the most optimum intra-prediction mode for the encoding target block. The cost comparison section 323*c* notifies the intra-prediction mode determined for each encoding target block to the prediction preparing section 321 and the reversible encoding unit 15.

4. Intra-Prediction Operation

Next, a case of dividing a macroblock of (16×16) pixels into the encoding target blocks of (4×4) pixels and determining the intra-prediction mode of a luminance component for each of the encoding target blocks will be described. The pixel signal of the pixels lined horizontally in the upper end of the encoding target block and the pixel signal of the pixels lined vertically in the left end of the encoding target block are used as the pixel signals in the encoding target block. For example, when the encoding target block is (4×4) pixels, the pixel signal of the pixels lined horizontally in the upper end of the encoding target block and the pixel signal of the pixels lined vertically in the left end of the encoding target block are used. The pixel signals used to prepare the prediction is not limited to the pixel signal in the upper end or the left end of the encoding target block. However, when the encoding target block is (8×8) pixels or (16×16) pixels, the pixel signal of a second line or third line from the upper end may be used. Alternatively, the pixel signal used to prepare the prediction may be generated from the pixel signal of a plurality of lines in the upper end or the left end of the encoding target block.

Figure 3:
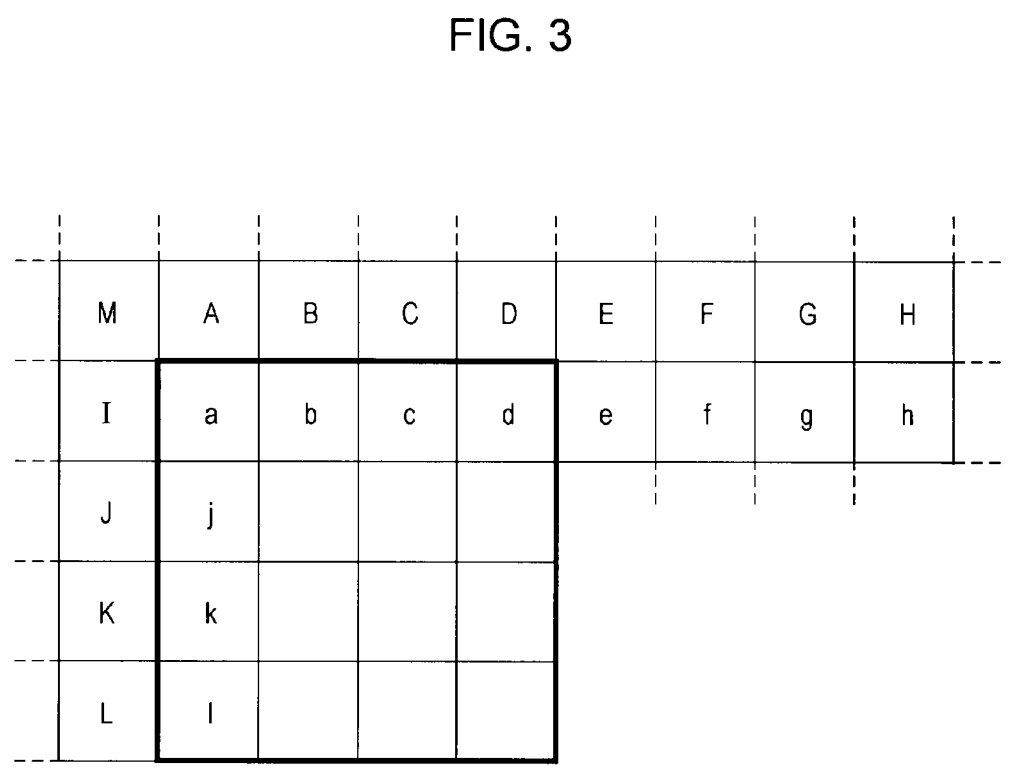

FIG. 3 is a diagram illustrating a positional relationship of the pixel signals in the intra-prediction operation. The pixel signals of the upper end and the left end of the encoding target block of the (4×4) pixels, which are a target of an intra-prediction operation, are set to pixel signals a to d, i, j, and k. Pixel signals of the block adjacent to the left side, the upper left side, the upper side, the upper right side, and the right side of the encoding target block are set to pixel signals A to M, e, f, g, h. When the intra-prediction operation is executed without using the pixel signals of the block adjacent to the right side of the encoding target block, the pixel signal d of the upper right end of the encoding target block is used as the pixel signals e, f, g, and h.

The prediction preparing section 321 of the intra-prediction unit 32 prepares the intra-prediction for each intra-prediction mode by using at least ones of the pixel signals in the upper end of the encoding target block and the pixel signals in the left end of the encoding target block among the pixel signals in the encoding target block.

FIGS. 4A to 4J are diagrams illustrating a 4 by 4 intra-prediction mode and illustrating a case where the prediction is prepared using the pixel signals in the encoding target block. For example, the prediction is prepared using both of the pixel signals of the pixels lined horizontally in the upper end of the encoding target block and the pixel signals of the pixels lined vertically in the left end of the encoding target block.

FIG. 4A shows the positions of the pixel signals generated. For example, a pixel signal Pred (0, 0) is generated in the pixel in the upper left end of a block, a pixel signal Pred (0, 3) is generated in the pixel in the lower left end of the block, a pixel Pred (3, 0) is generated in the pixel in the upper right end of the block, and a pixel signal Pred (3, 3) is generated in the pixel in the lower right end of the block.

Mode 0

Mode 0 corresponds to "a vertical prediction". The prediction preparing section 321 generates the prediction values of the pixel signals Pred (0, 0) to Pred (3, 3) by using the pixel signals a, b, c, and d, as in FIG. 4B and Expression 13. A pixel signal A in Expression 13 is set to the pixel signal a in the encoding target block. Likewise, pixel signals B, C, and D are set to the pixel signals b, c, and d in the encoding target block.

Expression 13

$$\text{Pred}(0,0),(0,1),(0,2),(0,3){:}\ A$$

$$\text{Pred}(1,0),(1,1),(1,2),(1,3){:}\ B$$

$$\text{Pred}(2,0),(2,1),(2,2),(2,3){:}\ C$$

$$\text{Pred}(3,0),(3,1),(3,2),(3,3){:}\ D \tag{13}$$

Mode 1

Mode 1 corresponds to "a horizontal prediction". The prediction preparing section 321 generates the prediction values of the pixel signals Pred (0, 0) to Pred (3, 3) by using the pixel signals a, j, k, and l, as in FIG. 4C and Expression 14. A pixel signal I in Expression 14 is set to the pixel signal a in the encoding target block. Likewise, pixel signals J, K, and L are set to the pixel signals j, k, and l in the encoding target block.

Expression 14

$$\text{Pred}(0,0),(1,0),(2,0),(3,0){:}\ I$$

$$\text{Pred}(0,1),(1,1),(2,1),(3,1){:}\ J$$

$$\text{Pred}(0,2),(1,2),(2,2),(3,2){:}\ K$$

$$\text{Pred}(0,3),(1,3),(2,3),(3,3){:}\ L \tag{14}$$

Mode 2

Mode 2 corresponds to "a DC prediction". The prediction preparing section 321 generates prediction values of the pixel signals Pred (0, 0) to Pred (3, 3) by using the pixel signals a to d, and j to l, as in FIG. 4D and Expression 15. A pixel signal A in Expression 15 is set to the pixel signal a in the encoding target block. Likewise, pixel signals B, C, D, I, J, K, and L are set to the pixel signals b, c, d, a, j, k, and l in the encoding target block.

Expression 15

$$(A+B+C+D+I+J+K+L+4)\gg 3 \tag{15}$$

Mode 3

Mode 3 corresponds to "a diagonal down-left prediction". The prediction preparing section 321 generates prediction values of the pixel signals Pred (0, 0) to Pred (3, 3) by using the pixel signals a to d or a to h, as in FIG. 4E and Expression 16. A pixel signal A in Expression 16 is set to the pixel signal a in the encoding target block. Likewise, pixel signals B, C, D, E, F, G, and H are set to the pixel signals b, c, d, e, f, g, and h in the encoding target block. When the intra-prediction operation is executed without using the pixel signals of the block adjacent to the right side of the encoding target block, the pixel signals E, F, G, and H are set to the pixel signal d in the encoding target block.

Expression 16

$$\text{Pred}(0,0){:}\ (A+2B+C+2)\gg 2$$

$$\text{Pred}(1,0),(0,1){:}\ (B+2C+D+2)\gg 2$$

$$\text{Pred}(2,0),(1,1),(0,2){:}\ (C+2D+E+2)\gg 2$$

$$\text{Pred}(3,0),(2,1),(1,2),(0,3){:}\ (D+2E+F+2)\gg 2$$

$$\text{Pred}(3,1),(2,2),(1,3){:}\ (E+2F+G+2)\gg 2$$

$$\text{Pred}(3,2),(2,3){:}\ (F+2G+H+2)\gg 2$$

$$\text{Pred}(3,3){:}\ (G+3H+2)\gg 2 \tag{16}$$

Mode 4

Mode 4 corresponds to "a diagonal down-right prediction". The prediction preparing section 321 generates prediction values of the pixel signals Pred (0, 0) to Pred (3, 3) by using the pixel signals a to d and j to l, as in FIG. 4F and Expression 17. A pixel signal A in Expression 17 is set to the pixel signal a in the encoding target block. Likewise, pixel signals B, C, D, I, J, K, L and M are set to the pixel signals b, c, d, a, j, k, l, and a in the encoding target block.

Expression 17

$$Pred(0,3): (J+2K+L+2) \gg 2$$
$$Pred(0,2),(1,3): (I+2J+K+2) \gg 2$$
$$Pred(0,1),(1,2),(2,3): (M+2I+J+2) \gg 2$$
$$Pred(0,0),(1,1),(2,2),(3,3): (A+2M+1+2) \gg 2$$
$$Pred(1,0),(2,1),(3,2): (M+2A+B+2) \gg 2$$
$$Pred(2,0),(3,1): (A+2B+C+2) \gg 2$$
$$Pred(3,0): (B+2C+D+2) \gg 2 \quad (17)$$

Mode 5

Mode 5 corresponds to "a vertical-right prediction". The prediction preparing section 321 generates prediction values of the pixel signals Pred (0, 0) to Pred (3, 3) by using the pixel signals a to d, j, and k, as in FIG. 4G and Expression 18. A pixel signal A in Expression 18 is set to the pixel signal a in the encoding target block. Likewise, pixel signals B, C, D, I, J, K and M are set to the pixel signals b, c, d, a, j, k and a in the encoding target block.

Expression 18

$$Pred(0,0),(1,2): (M+A+1) \gg 1$$
$$Pred(1,0),(2,2): (A+B+1) \gg 1$$
$$Pred(2,0),(3,2): (B+C+1) \gg 1$$
$$Pred(3,0): (C+D+1) \gg 1$$
$$Pred(0,1),(1,3): (I+2M+A+2) \gg 2$$
$$Pred(1,1),(2,3): (M+2A+B+2) \gg 2$$
$$Pred(2,1),(3,3): (A+2B+C+2) \gg 2$$
$$Pred(3,1): (B+2C+D+2) \gg 2$$
$$Pred(0,2): (M+2I+J+2) \gg 2$$
$$Pred(0,3): (I+2J+K+2) \gg 2 \quad (18)$$

Mode 6

Mode 6 corresponds to "a horizontal-down prediction". The prediction preparing section 321 generates prediction values of the pixel signals Pred (0, 0) to Pred (3, 3) by using the pixel signals a to c and j to l, as in FIG. 4H and Expression 19. A pixel signal A in Expression 19 is set to the pixel signal a in the encoding target block. Likewise, pixel signals B, C, I, J, K, L and M are set to the pixel signals b, c, a, j, k, l and a in the encoding target block.

Expression 19

$$Pred(0,0),(2,1): (M+I+1) \gg 1$$
$$Pred(1,0),(3,1): (I+2M+A+2) \gg 2$$
$$Pred(2,0): (M+2A+B+2) \gg 2$$
$$Pred(3,0): (A+2B+C+2) \gg 2$$
$$Pred(0,1),(2,2): (I+J+1) \gg 1$$
$$Pred(1,1),(3,2): (M+2I+J+2) \gg 2$$
$$Pred(0,2),(2,3): (J+K+1) \gg 1$$
$$Pred(1,2),(3,3): (I+2J+K+2) \gg 2$$
$$Pred(0,3): (K+L+1) \gg 1$$
$$Pred(1,3): (J+2K+L+2) \gg 2 \quad (19)$$

Mode 7

Mode 7 corresponds to "a vertical-left prediction". The prediction preparing section 321 generates prediction values of the pixel signals Pred (0, 0) to Pred (3, 3) by using the pixel signals a to d or a to g, as in FIG. 4I and Expression 20. A pixel signal A in Expression 20 is set to the pixel signal a in the encoding target block. Likewise, pixel signals B, C, D, E, F and G are set to the pixel signals b, c, d, e, f and g in the encoding target block. When the intra-prediction operation is executed without using the pixel signals of the block adjacent to the right side of the encoding target block, the pixel signals E, F, and G are set to the pixel signal d in the encoding target block.

Expression 20

$$Pred(0,0): (A+B+1) \gg 1$$
$$Pred(1,0),(0,2): (B+C+1) \gg 1$$
$$Pred(2,0),(1,2): (C+D+1) \gg 1$$
$$Pred(3,0),(2,2): (D+E+1) \gg 1$$
$$Pred(3,2): (E+F+1) \gg 1$$
$$Pred(0,1): (A+2B+C+2) \gg 2$$
$$Pred(1,1),(0,3): (B+2C+D+2) \gg 2$$
$$Pred(2,1),(1,3): (C+2D+E+2) \gg 2$$
$$Pred(3,1),(2,3): (D+2E+F+2) \gg 2$$
$$Pred(3,3): (E+2F+G+2) \gg 2 \quad (20)$$

Mode 8

Mode 8 corresponds to "a horizontal-up prediction". The prediction preparing section 321 generates prediction values of the pixel signals Pred (0, 0) to Pred (3, 3) by using the pixel signals a and j to l, as in FIG. 4J and Expression 21. A pixel signal I in Expression 21 is set to the pixel signal a in the encoding target block. Likewise, pixel signals J, K, and L are set to the pixel signals j, k, and l in the encoding target block.

Expression 21

$$Pred(0,0): (I+J+1) \gg 1$$
$$Pred(1,0): (I+2J+K+2) \gg 2$$
$$Pred(2,0),(0,1): (J+K+1) \gg 1$$
$$Pred(3,0),(1,1): (J+2K+L+2) \gg 2$$
$$Pred(2,1),(3,2): (K+L+1) \gg 1$$
$$Pred(3,1),(1,2): (K+3L+2) \gg 2$$
$$Pred(2,2),(3,2),(0,3),(1,3),(2,3),(3,3): L \quad (21)$$

Figure 5:
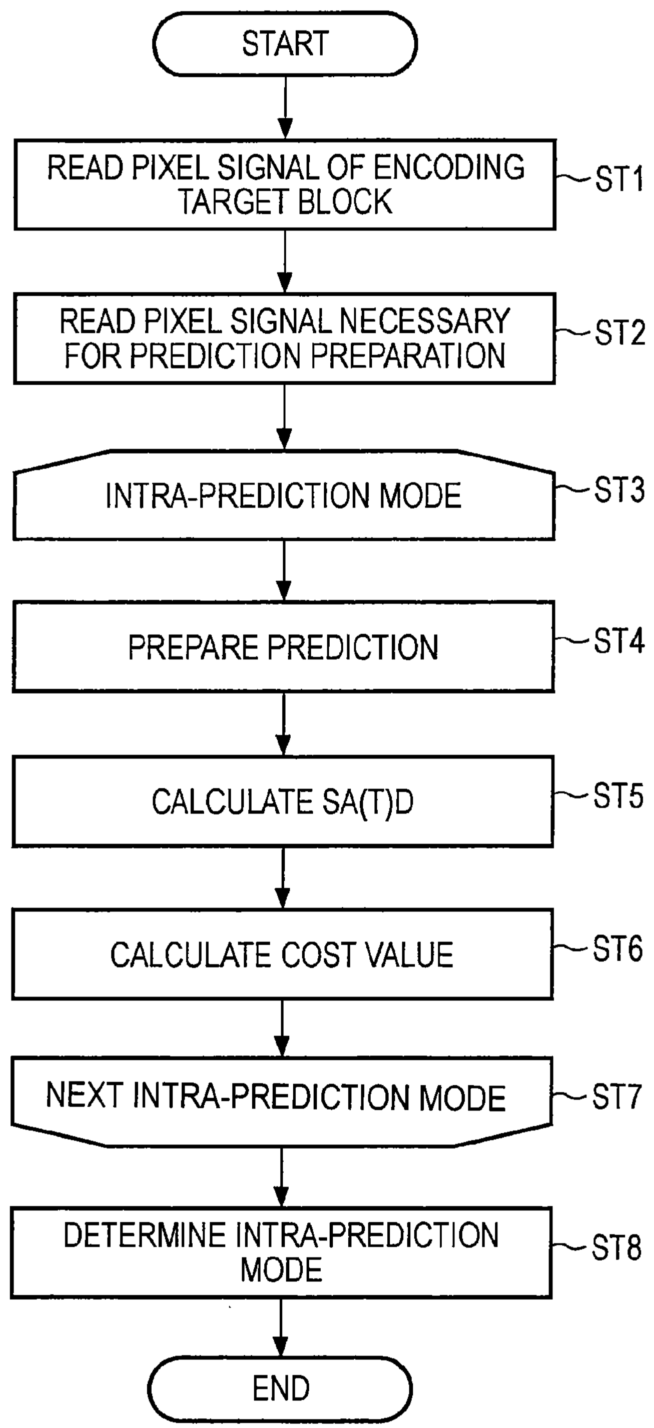
FIG. 5 is a flowchart illustrating an intra-prediction operation.

FIG. 5 is a flowchart illustrating the intra-prediction operation on one encoding target block.

In step ST1, the intra-prediction unit 32 reads the pixel signals of the encoding target block. The intra-prediction unit 32 outputs the pixel signal (luminance signal) of the encoding target block of (4×4) pixels from the pixel signals stored in the intra-prediction buffer 31 to the SA(T)D calculation section 323*a*, and then the process proceeds to step ST2.

In step ST2, the intra-prediction unit 32 reads the pixel signals necessary for the prediction preparation from the encoding target block. The intra-prediction unit 32 reads the pixel signals (luminance signals) necessary for the prediction preparation from the intra-prediction buffer 31 and supplies the read pixel signals to the prediction preparing section 321. Then, the process proceeds to step ST3.

In steps ST3 to ST7, the process is executed on the encoding target block in each intra-prediction mode. In step ST4, the intra-prediction unit 32 prepares the prediction, and then process proceeds to step ST5.

In step ST5, the intra-prediction unit 32 calculates the SA(T)D. The SA(T)D calculation section 323*a* of the intra-prediction unit 32 calculates the SA(T)D for the encoding target block by using the pixel signals of the encoding target image and the pixel signals of the encoded image stored in the frame memory 25. Then, the process proceeds to step ST6.

In step ST6, the intra-prediction unit 32 calculates the cost values. The cost derivation section 323*b* of the intra-prediction unit 32 calculates the cost values by using the SA(T)D calculated in step ST5.

The processes in steps ST4 to ST6 are executed in each intra-prediction mode. When the cost values for all of the intra-prediction modes are completely calculated, the process proceeds from step ST7 to ST8.

In step ST8, the intra-prediction unit 32 determines the most appropriate intra-prediction mode. The cost comparison section 323*c* of the intra-prediction unit 32 compares the cost values calculated in the intra-prediction modes, and determines the intra-prediction mode with the smallest cost value as the most appropriate intra-prediction mode.

By executing this process on the blocks of (4×4) pixels forming the macroblock, the intra-prediction operation can be executed on the macroblock. When the process is executed on the macroblock, the process shown in FIG. 5 is executed sixteen times upon executing the intra-prediction operation for a luminance component in each block of (4×4) pixels. Upon executing the intra-prediction operation for the luminance component in each block of (8×8) pixels, the process shown in FIG. 5 is executed four times. Upon executing the intra-prediction operation for the luminance component in each block of (16×16) pixels, the process shown in FIG. 5 is executed once. Moreover, when the intra-prediction operation is executed for a color difference component Cb, the process shown in FIG. 5 is executed four times. When the intra-prediction operation is executed for a color difference component Cr, the process shown in FIG. 5 is executed four times.

Figure 6A:
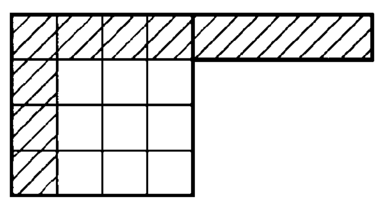
FIGS. 6A to 6C are diagrams illustrating a positional relationship between the pixels for prediction preparation in a 4 by 4 block and the pixels of the encoding target block.
Figure 6B:
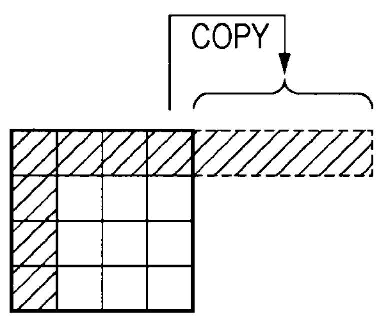
Figure 6C:
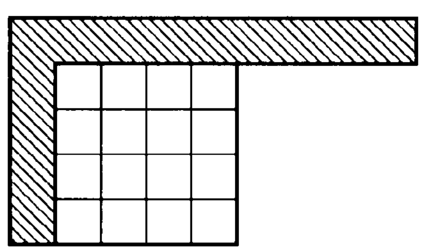

FIGS. 6A to 6C are diagrams illustrating a positional relationship between the pixels for prediction preparation in a 4 by 4 block and the pixels of the encoding target block. FIG. 6A shows a case where the prediction is prepared using the pixel signals of the pixels lined horizontally in the upper end and the pixels lined vertically in the left end of the encoding target block and the pixel signals of the pixels lined horizontally in the upper end of an encoding target block adjacent to the right side of the encoding target block. FIG. 6B shows a case where the prediction is prepared using the pixel signals of the pixels lined horizontally in the upper end of the encoding target block and the pixel signals of the pixels lined vertically in the left end of the encoding target block. FIG. 6C shows a case where the prediction is prepared using pixel signals of encoding target images of a block adjacent to the encoding target block in the method disclosed in Japanese Unexamined Patent Application Publication No. 2007-150913.

In the method according to related art shown in FIG. 6C, it is necessary to store the pixel signals of nine pixels lined horizontally in the lower end of a block adjacent to the upper side of the encoding target block in the encoding target image and pixel signals lined vertically in the right end of a block adjacent to the left side of the encoding target block. However, in a method shown in FIG. 6A or 6B, it is not necessary to store the pixel signals of the block adjacent to the upper side or the left side of the encoding target block. Accordingly, the intra-prediction mode can be determined with a simple configuration.

Figure 7A:
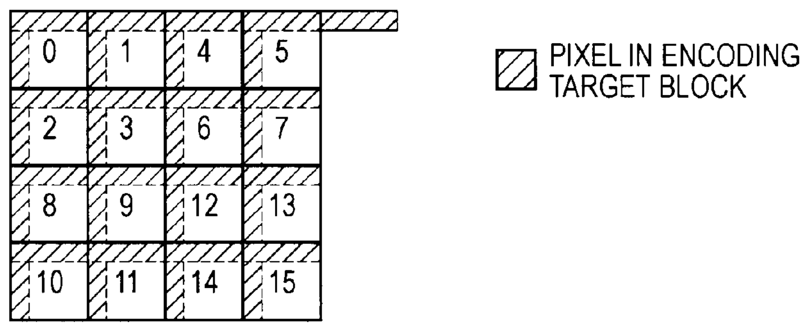
FIGS. 7A to 7C are diagrams illustrating a positional relationship between the pixels for prediction preparation in one macroblock and the pixels of the encoding target block.
Figure 7B:
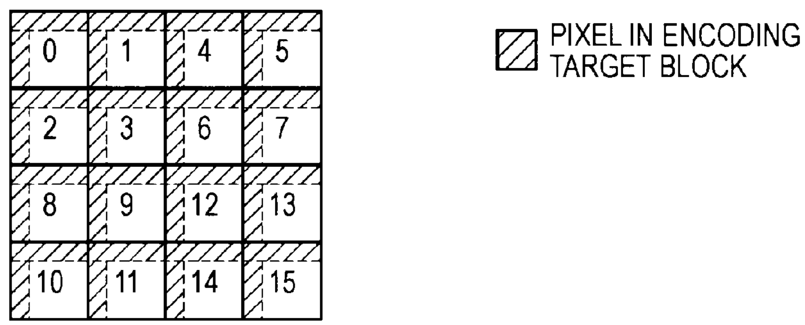
Figure 7C:
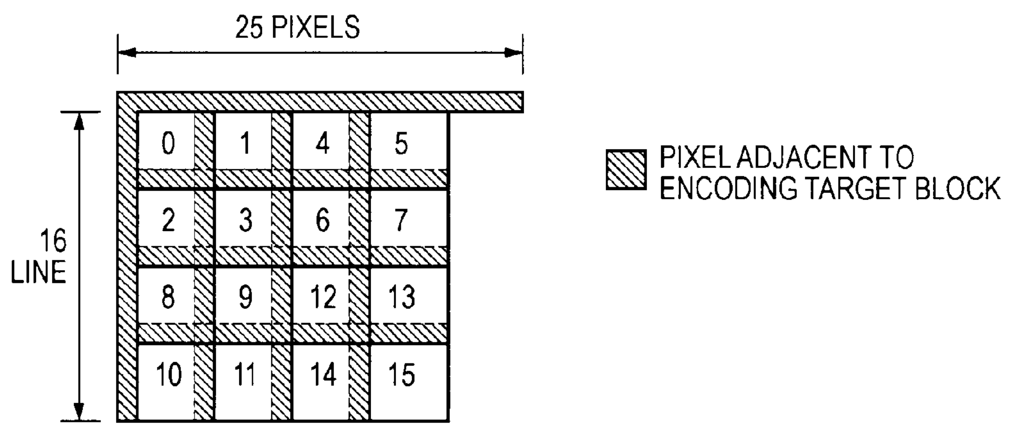

FIGS. 7A to 7C are diagrams illustrating a positional relationship between the pixels for prediction preparation in one macroblock and the pixels of the encoding target block. FIG. 7A shows a case where the prediction is prepared using the pixel signals of the pixels lined horizontally in the upper end of the encoding target block, the pixel signals of the pixels lined vertically in the left end of the encoding target block, and the pixel signals of the pixels lined horizontally in the upper end of an encoding target block on the right side. FIG. 7B shows a case where the prediction of (4×4) pixels is prepared using the pixel signals of the pixels lined horizontally in the upper end of the encoding target block and the pixel signals of the pixels lined vertically in the left end of the encoding target block. FIG. 7C shows a case where the prediction of (4×4) pixels is prepared using pixel signals of encoding target images of a block adjacent to the encoding target block in the method disclosed in Japanese Unexamined Patent Application Publication No. 2007-150913.

In the method according to related art shown in FIG. 7C, in order to execute the most efficient process of one macroblock, a memory capacity storing pixel signals of the encoding target image of 125 pixels (=25 pixels+16 pixels×4 lines+3 pixels×4×3) is necessary. However, by using the method shown in FIG. 7A or 7B, the intra-prediction mode can be determined with the simple configuration, even though the pixel signals of the encoding target image of the block adjacent to the upper side or the left side of the encoding target block are not stored.

Figures 8A, 8B, 8C:
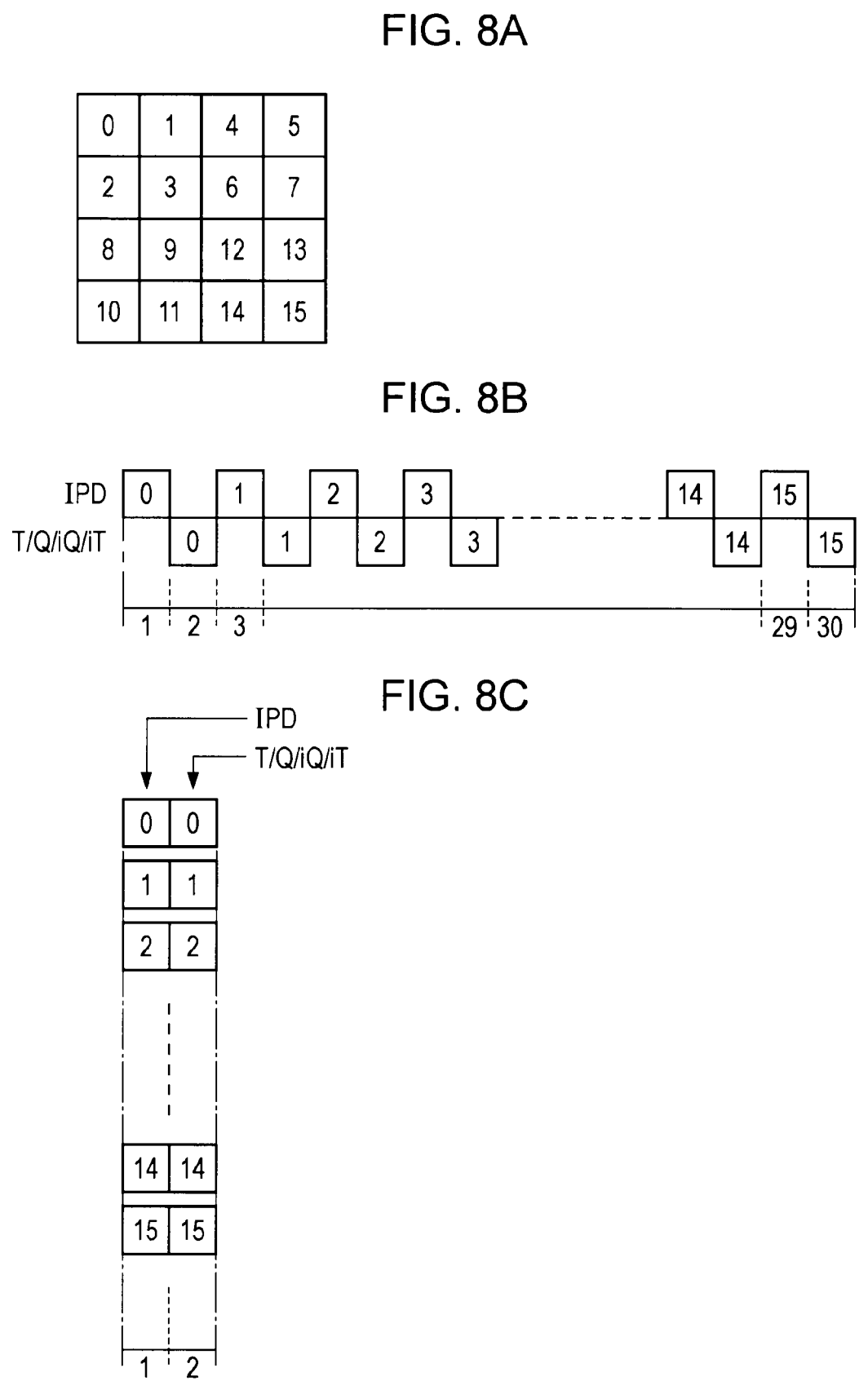

FIGS. 8A to 8C are diagrams illustrating processing time. In the intra-prediction of the block of (4×4) pixels in one macroblock, the processing order of the block of (4×4) pixels is shown in FIG. 8A. Here, it is assumed that intra-prediction is "IPD", orthogonal transform "T", quantization is "Q", inverse quantization is "iQ", and inverse orthogonal transform "iT". When an encoded image stored in the frame memory 25 is used, "IPD", "T", "Q", "iQ", and "iT" are executed and it is necessary to use the pixels of which coefficients are added after the prediction of IPD and the inverse orthogonal transform of iT. When "IPD" is executed in one cycle and "T/Q/iQ/iT" is executed in one cycle, thirty cycles are necessary, as in FIG. 8B, in order to complete the intra-prediction operation in a case where sixteen blocks forming the macroblock are processed in order shown in FIG. 8A. However, when the intra-prediction operation is executed using the pixel signals of the predicted block, the dependency of the processing order of each block disappears. Therefore, by making the intra-predictions parallel, as in FIG. 8C, the intra-prediction operation is completed in two cycles. Accordingly, the intra-prediction operation is completed quickly.

When the intra-prediction unit 32 uses the pixel signals of an encoded image as the pixel signals in the encoding target block, the pixel signals of the encoding target block are read from the encoded image stored in the frame memory 25 to generate the prediction, as indicated by a dash line in FIG. 2. The intra-prediction unit 32 calculates the cost values from the generated prediction and the encoding target image of the encoding target block and determines the appropriate intra-prediction mode in the encoding target block.

5. Second Configuration of Intra-Prediction Buffer and Intra-Prediction Unit

When correlation between the image in the intra-prediction target block and the image in the block adjacent to the intra-prediction target block is high upon executing the intra-prediction operation with the configuration shown in FIG. 2, the same intra-prediction result as that obtained by using the pixel signals of the adjacent block can be obtained even using the pixel signals in the intra-prediction target block. For example, when the pixel signals of the upper end of the intra-prediction target block are almost the same as those of the lower end of the adjacent block and the pixel signals of the left end of the intra-prediction target block are almost the same as those of the right end of the adjacent block, the same intra-prediction result as that obtained when the pixel signals of the adjacent block are obtained.

However, when the correlation between the image in the intra-prediction target block and the image in the adjacent block is low, the precision of the intra-prediction operation may deteriorate, compared to the case of using the pixel signals of the adjacent block. Therefore, the intra-prediction operation may be executed by preparing the prediction using the pixel signals of the upper end of the encoding target block or the pixel signals of the left end of the encoding target block and the pixel signals adjacent to the encoding target block of the encoding target image.

Figure 9:
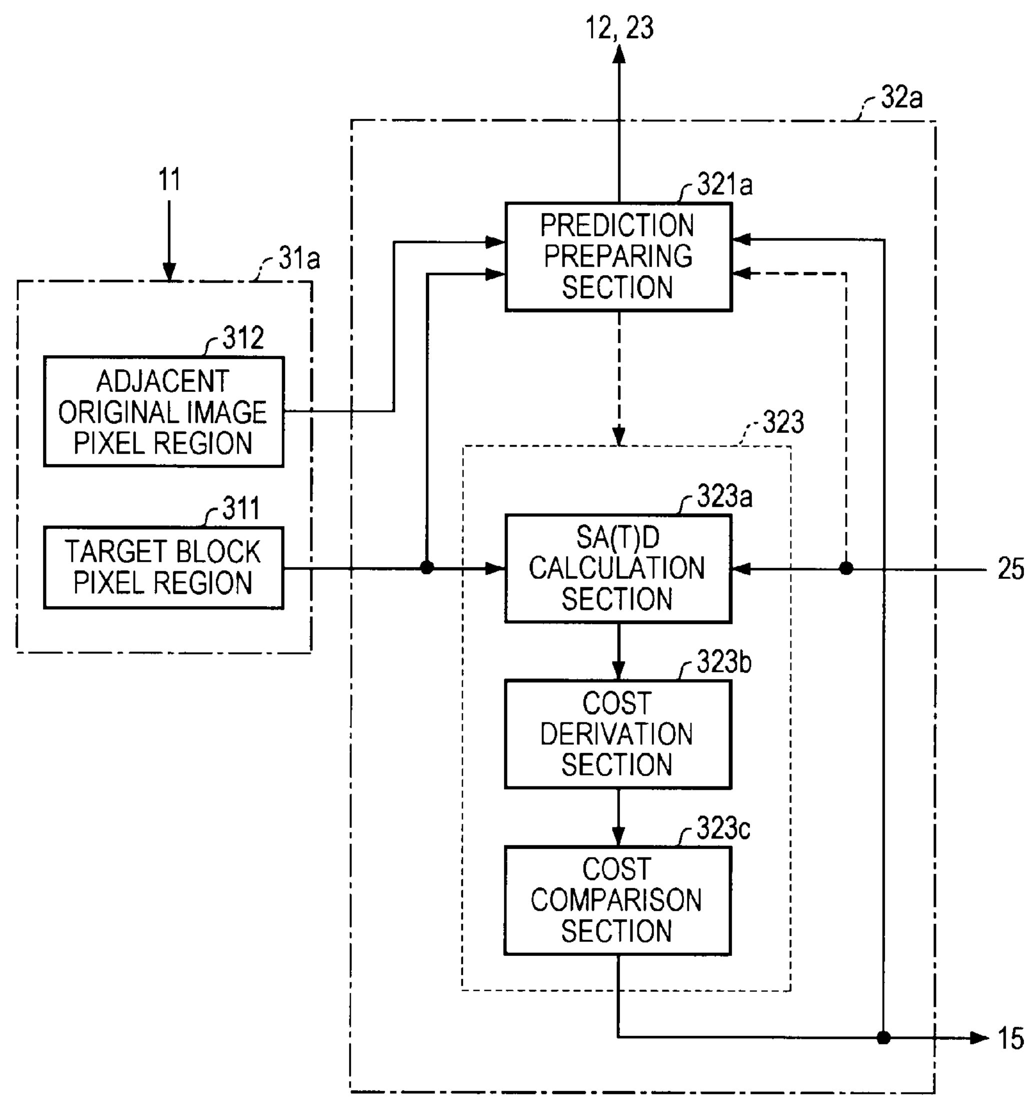
FIG. 9 is a diagram illustrating a second configuration of the intra-prediction buffer and the intra-prediction unit.

FIG. 9 is a diagram illustrating another configuration of the intra-prediction buffer and the intra-prediction unit. FIG. 9 shows a case where the prediction is prepared using the pixel signals of the upper end of the encoding target block or the pixel signals of the left end of the encoding target block and the pixel signals adjacent to the encoding target block of the encoding target image.

An intra-prediction buffer 31*a* has: a target block pixel region 311 storing the image signals of the encoding target block; and an adjacent original image pixel region 312 storing the pixel signals adjacent to the encoding target block in the encoding target image.

The intra-prediction unit 32*a* includes a prediction preparing section 321*a* and a prediction mode derivation section 323.

The prediction preparing section 321*a* prepares the prediction for each intra-prediction mode by using the pixel signals of the encoding target block and the pixel signals stored in the adjacent original image pixel region 312 of the intra-prediction buffer 31*a*. The prediction preparing section 321*a* uses, as the pixel signals of the encoding target block, the pixel signals of the pixels lined horizontally in the upper end and the pixel signals of the pixels lined vertically in the left end. The prediction preparing section 321*a* prepares the prediction in the intra-prediction mode determined by the prediction mode derivation section 323 and outputs the pixel signals representing the prepared prediction to the subtraction unit 12. When using the pixel signals of the pixels lined horizontally in the upper end of the encoding target block, the prediction preparing section 321*a* prepares the prediction by using the pixel signals of the pixels lined vertically in the right end from the block adjacent to the left side of the encoding target block from the encoding target image. When the prediction preparing section 321*a* uses the pixel signals of the pixels lined vertically in the left end of the encoding target block, the prediction preparing section 321*a* prepares the prediction by using the pixel signals of the pixels lined horizontally in the lower end from the block adjacent to the upper side of the encoding target block in the encoding target image.

The prediction mode derivation section 323 includes an SA(T)D calculation section 323*a*, a cost derivation section 323*b*, and a cost comparison section 323*c*.

The SA(T)D calculation section 323*a* calculates the SA(T)D and the SA(T)D0 for the encoding target block by using the pixel signal of the encoding target image and the pixel signals of an encoded image. The SA(T)D calculation section 323*a* outputs the calculated SA(T)D and SA(T)D0 to the cost derivation section 323*b*. The SA(T)D calculation section 323*a* calculates the SA(T)D and the SA(T)D0 for each block in each intra-prediction mode by using Expressions 2 and 10.

The cost derivation section 323*b* calculates Expression 1 using the SA(T)D and the SA(T)D0 supplied from the SA(T)D calculation section 323*a*, calculates the cost values, and outputs the cost values to the cost comparison section 323*c*. The cost derivation section 323*b* calculates the cost value for each block in each intra-prediction mode.

The cost comparison section 323*c* compares the cost values calculated by the cost derivation section 323*b* in each intra-prediction mode. Then, the cost comparison section 323*c* determines the prediction mode with the smallest cost value as the most appropriate intra-prediction mode. The cost comparison section 323*c* notifies the intra-prediction mode determined for each encoding target block to the prediction preparing section 321*a* and the reversible encoding unit 15.

6. Intra-Prediction Operation

Depending on the direction of the processing order of the macroblock, the intra-prediction buffer 31*a* and the intra-prediction unit 32*a* select the pixel signals to be used in the intra-prediction operation or set the pixel signals stored in the adjacent original image pixel region 312, when the prediction is prepared. For example, when the process of the macroblock is executed horizontally in order, the pixel signals of the upper end of the encoding target block are used. The pixel signals of the pixels lined vertically in the right end of the block adjacent to the left side of the encoding target block in the encoding target image are stored in the adjacent original image pixel region 312.

FIGS. 10A and 10B are diagrams illustrating a 4 by 4 intra-prediction mode. FIGS. 10A and 10B show a case where the pixel signals of the pixels lined horizontally in the upper end of the encoding target block and the pixel signals of the pixels lined vertically in the right end of the encoding target image of the block adjacent to the left side of the encoding target block are used as the pixel signals to be used to prepare the prediction.

FIG. 10A shows the positions of the pixel signals generated. For example, a pixel signal Pred (0, 0) is generated in the pixel in the upper left end of a block, a pixel signal Pred (0, 3) is generated in the pixel in the lower left end of the block, a pixel signal (3, 0) is generated in the pixel in the upper right end of the block, and a pixel signal Pred (3, 3) is generated in the pixel in the lower right end of the block. The expressions of the prediction values of the pixel signals Pred (0, 0) to Pred (3, 3) in Modes 0 to 8 are same as those described with reference to FIGS. 4A to 4J.

Mode 0

Mode 0 is "a vertical prediction". The prediction preparing section 321*a* generates the prediction values of the pixel signals Pred (0, 0) to Pred (3, 3) by using the pixel signals a, b, c, and d, as in FIG. 10B and Expression 13. A pixel signal A in Expression 13 is set to the pixel signal a in the encoding target block. Likewise, pixel signals B, C, and D are set to the pixel signals b, c, and d in the encoding target block.

Mode 1

Mode 1 corresponds to "a horizontal prediction". The prediction preparing section 321*a* generates the prediction values of the pixel signals Pred (0, 0) to Pred (3, 3) by using the pixel signals I, J, K, and L, as in FIG. 10C and Expression 14.

Mode 2

Mode 2 corresponds to "a DC prediction". The prediction preparing section 321*a* generates prediction values of the pixel signals Pred (0, 0) to Pred (3, 3) by using the pixel signals a to d, and I to L, as in FIG. 10D and Expression 15. A pixel signal A in Expression 15 is set to the pixel signal a in the encoding target block. Likewise, pixel signals B, C, and D are set to the pixel signals b, c, and d in the encoding target block.

Mode 3

Mode 3 corresponds to "a diagonal down-left prediction". The prediction preparing section 321*a* generates prediction values of the pixel signals Pred (0, 0) to Pred (3, 3) by using the pixel signals a to d or a to h, as in FIG. 10E and Expression 16. A pixel signal A in Expression 16 is set to the pixel signal a in the encoding target block. Likewise, pixel signals B, C, D, E, F, G, and H are set to the pixel signals b, c, d, e, f, g, and h in the encoding target block. When the intra-prediction operation is executed without using the pixel signals of the block adjacent to the right side of the encoding target block, the pixel signals E, F, G, and H are set to the pixel signal d in the encoding target block.

Mode 4

Mode 4 corresponds to "a diagonal down-right prediction". The prediction preparing section 321*a* generates prediction values of the pixel signals Pred (0, 0) to Pred (3, 3) by using the pixel signals a to d and I to L, as in FIG. 10F and Expression 17. A pixel signal A in Expression 17 is set to the pixel signal a in the encoding target block. Likewise, pixel signals B, C, and D are set to the pixel signals b, c, and d in the encoding target block. A pixel signal I, which is a pixel signal of the adjacent block is used as the pixel signal M.

Mode 5

Mode 5 corresponds to "a vertical-right prediction". The prediction preparing section 321*a* generates prediction values of the pixel signals Pred (0, 0) to Pred (3, 3) by using the pixel signals a to d and I and K, as in FIG. 10G and Expression 18. A pixel signal A in Expression 18 is set to the pixel signal a in the encoding target block. Likewise, pixel signals B, C, and D are set to the pixel signals b, c, and d in the encoding target block. The pixel signal I, which is a pixel signal of the adjacent block is used as the pixel signal M.

Mode 6

Mode 6 corresponds to "a horizontal-down prediction". The prediction preparing section 321*a* generates prediction values of the pixel signals Pred (0, 0) to Pred (3, 3) by using the pixel signals a to c and I to L, as in FIG. 10H and Expression 19. A pixel signal A in Expression 19 is set to the pixel signal a in the encoding target block. Likewise, pixel signals A, B, C, and D are set to the pixel signals a, b, c, and d in the encoding target block. The pixel signal I, which is a pixel signal of the adjacent block is used as the pixel signal M.

Mode 7

Mode 7 corresponds to "a vertical-left prediction". The prediction preparing section 321*a* generates prediction values of the pixel signals Pred (0, 0) to Pred (3, 3) by using the pixel signals a to d and I or a to h and I, as in FIG. 10I and Expression 20. A pixel signal A in Expression 20 is set to the pixel signal a in the encoding target block. Likewise, pixel signals B, C, D, E, F and G are set to the pixel signals b, c, d, e, f and g in the encoding target block. The pixel signal I, which is a pixel signal of the adjacent block is used as the pixel signal M. When the intra-prediction operation is executed without using the pixel signals of the block adjacent to the right side of the encoding target block, the pixel signals E, F, and G are set to the pixel signal d in the encoding target block.

Mode 8

Mode 8 corresponds to "a horizontal-up prediction". The prediction preparing section 321*a* generates prediction values of the pixel signals Pred (0, 0) to Pred (3, 3) by using the pixel signals I to L, as in FIG. 10J and Expression 21.

In this way, since the pixel signals of the encoding target image are used as the pixel signals of the block adjacent to either side of the upper and left sides, the deterioration in the precision can be reduced, compared to the case where the intra-prediction operation is executed only using the pixel signals in the block.

7. Another Intra-Prediction Operation

However, when the pixels in the encoding target block and the pixels adjacent to the encoding target block in the encoding target image are used, as in FIGS. 10A to 10J, pixel correlation is higher in the pixels than in the adjacent pixels. When the pixel correlation is high, the SA(T)D becomes low. For example, the prediction is prepared using the pixels of the encoding target block in "the vertical prediction" of Mode 0 and the prediction is prepared using the adjacent pixels in the "the horizontal prediction" of Mode 1. In this case, a difference in one line of the upper end becomes "0", since the pixel signals are the same. The SA(T)D of Mode 0 is lower than that of Mode 1, and thus the prediction mode using the pixels of the encoding target block is easily selected.

For this reason, the SA(T)D is corrected by calculating the offset amount of each mode in accordance with the prediction mode using the pixels of the encoding target block and the SA(T)D and adding the offset amount of each mode to the SA(T)D. As shown in FIGS. 10A to 10J, Table 1 shows exemplary correction expressions of the SA(T)D in the intra-prediction modes when the pixel signals of the pixels lined horizontal in the upper end of the encoding target block are used as the pixel signal of the adjacent block.

TABLE 1

| PREDICTION MODE OF PRECISION SIGNAL (4 × 4 PIXELS) | | CORRECTION EXPRESSION |
|---|---|---|
| MODE 0 | vertical | SA(T)D+=3/8xSA(T)D |
| MODE 1 | horizontal | SA(T)D+=0 |
| MODE 2 | DC | SA(T)D+=1/8xSA(T)D |
| MODE 3 | diagonal down-left | SA(T)D+=2/8xSA(T)D |
| MODE 4 | diagonal down-right | SA(T)D+=1/8xSA(T)D |
| MODE 5 | vertical-right | SA(T)D+=1/8xSA(T)D |
| MODE 6 | horizontal-down | SA(T)D+=1/8xSA(T)D |
| MODE 7 | vertical-left | SA(T)D+=2/8xSA(T)D |
| MODE 8 | horizontal-up | SA(T)D+=0 |

In Table 1, an offset amount of each mode is set to "0" in Modes 2 and 8 in which the pixel signals of the block are not used.

When the pixel signals of the upper end of the encoding target block are used as the pixel signals of the adjacent block, the offset amount is expected to be reduced by about (¼)×SA(T)D, since one line is the same among four lines of the encoding target block in Mode 0. Because of using the pixel signals of a block different from the adjacent block, the offset amount of Mode 0 is set to (⅜)×SA(T)D by adding a value smaller than (¼), for example, (⅛). In Modes 3 and 7, a decrease in the SA(T)D is smaller than in Mode 0 because of using the pixel signals of the adjacent block also. Therefore, the offset amount of the mode is set to (2/8)×SA(T)D, for example. In Modes 2, 4, 5, and 6, the offset amount of each mode is set to (⅛)×SA(T)D, because of using the pixel signals of the adjacent block adjacent to the left end of the encoding target mode.

Figure 11:
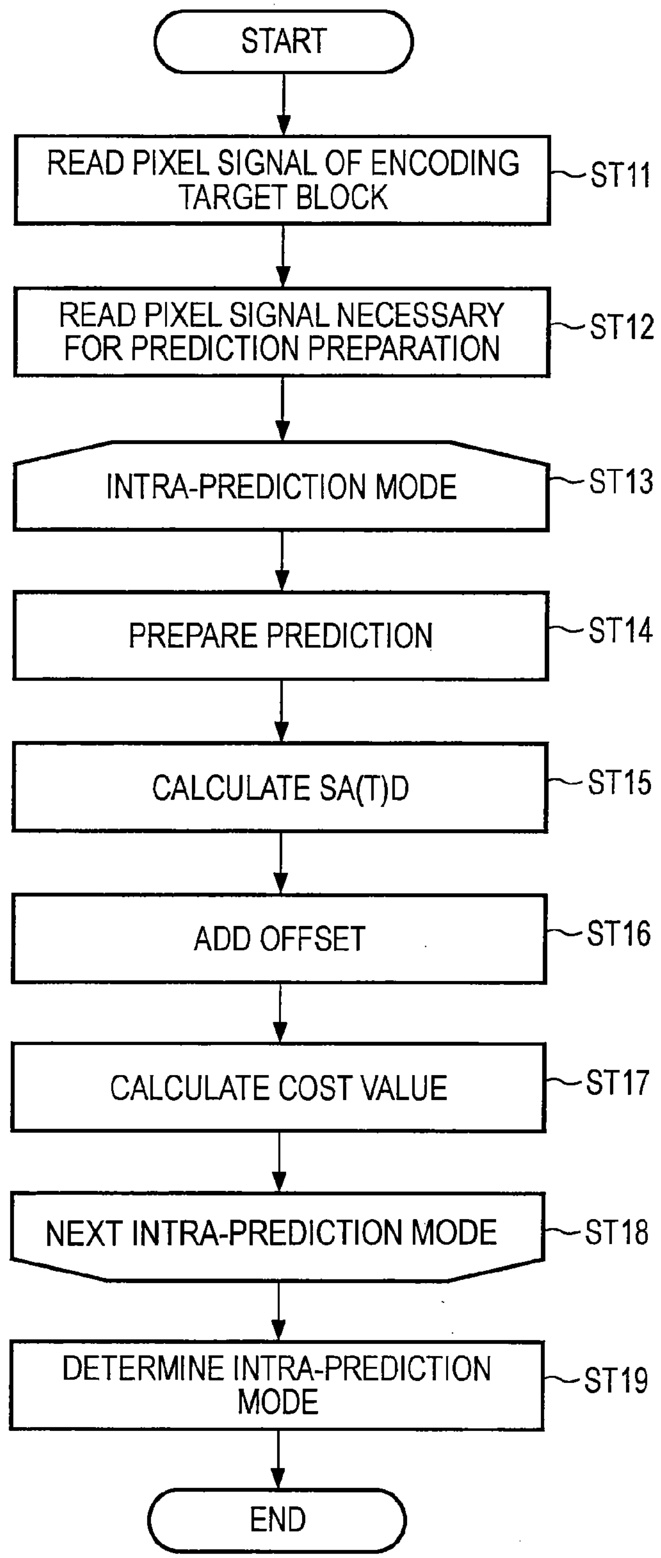
FIG. 11 is a flowchart illustrating the intra-prediction operation in which an offset adding operation is executed.

FIG. 11 is a flowchart illustrating the intra-prediction operation in which an offset adding operation is executed. The offset amount of each mode is calculated in accordance with the prediction mode using the pixels of the block and the SA(T)D. The SA(T)D is corrected by adding the offset amount of each mode, and then the intra-prediction operation of the encoding target block is executed using the corrected SA(T)D.

In step ST11, the intra-prediction unit 32*a* reads the pixel signals of the encoding target block. The intra-prediction unit 32*a* outputs the pixel signal of the encoding target block of (4×4) pixels from the pixel signals stored in the intra-prediction buffer 31*a* to the SA(T)D calculation section 323*a*, and then the process proceeds to step ST12.

In step ST12, the intra-prediction unit 32*a* reads the pixel signals necessary for the prediction preparation from the encoding target block. The intra-prediction unit 32*a* reads the pixel signals of the block necessary for the prediction preparation from the frame memory 25 and supplies the read pixel signals to the prediction preparing section 321*a*. The intra-prediction unit 32*a* reads the pixel signals of the adjacent block necessary for prediction preparation from the adjacent original image pixel region 312 of the intra-prediction buffer 31*a* and supplies the read pixel signals to the prediction preparing section 321*a*. Then, the process proceeds to step ST13.

In steps ST13 to ST18, each process is executed on the encoding target block in each intra-prediction mode. In step ST14, the intra-prediction unit 32*a* prepares the prediction, and then process proceeds to step ST15.

In step ST15, the intra-prediction unit 32*a* calculates the SA(T)D. The SA(T)D calculation section 323*a* of the intra-prediction unit 32*a* calculates the SA(T)D for the encoding target block by using the pixel signals of the encoding target image and the pixel signals of the encoded image stored in the frame memory 25. Then, the process proceeds to step ST16.

In step ST16, the intra-prediction unit 32*a* executes the offset adding operation. The cost derivation section 323*b* of the intra-prediction unit 32*a* calculates the offset amount of each mode in accordance with the SA(T)D and the intra-prediction mode, when the prediction is prepared using the pixel signals of the block. The cost derivation section 323*b* adds the calculated offset amount of each mode, and then process proceeds step ST17.

In step ST17, the intra-prediction unit 32*a* calculates the cost value. The cost derivation section 323*b* of the intra-prediction unit 32*a* calculates the cost value by using the SA(T)D corrected by adding the offset amount of each mode in step ST16.

The processes in steps ST14 to ST17 are executed in each intra-prediction mode. When the cost values for all of the intra-prediction modes are completely calculated, the process proceeds from step ST18 to ST19.

In step ST19, the intra-prediction unit 32*a* determines the most appropriate intra-prediction mode. The cost comparison section 323*c* of the intra-prediction unit 32*a* compares the cost values calculated in the intra-prediction modes, and determines the intra-prediction mode with the smallest cost value as the most appropriate intra-prediction mode.

The image encoding apparatus can execute the intra-prediction operation of the macroblock by executing the above-described process on the block of (4×4) pixels forming the macroblock. The image encoding apparatus adds the offset amount of each mode to the SA(T)D, when the image encoding apparatus prepares the prediction by using the pixel signals in the encoding target block and the pixel signals of the encoding target image. Accordingly, it is possible to execute the intra-prediction operation in which influence caused by the use of the pixel signals of the block and the pixel signals of the encoding target image is reduced.

8. Direction of Process Order of Macro Block and Intra-Prediction Operation

Depending on the direction of processing order the macroblock, the prediction preparing section 321*a* of the intra-prediction unit 32*a* uses the pixel signals of the pixels lined horizontally in the upper end of the encoding target block or the pixel signals of the pixels lined vertically in the left end of the encoding target block.

Figure 12:
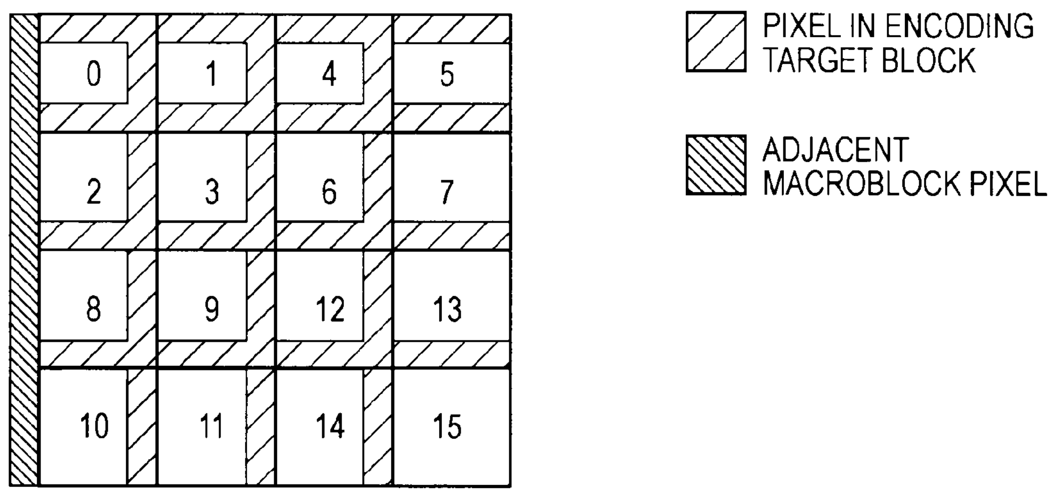
FIG. 12 is a diagram illustrating the intra-prediction operation when processing order of the macroblocks is horizontal.

When the processing order of the macroblock is horizontal, the macroblock being processed and the macroblock located on the upper side are separated from each other in terms of the processing order. Accordingly, when the macroblock is processed horizontally in sequence, it is difficult to share the pixel signals of one line of the upper portion of the macroblock being processed. Therefore, the intra-prediction unit 32*a* uses the pixel signals of the pixels lined horizontally in the upper portion of each block located in the upper portion of the macroblock, when the intra-prediction unit 32*a* sequentially executes the intra-prediction operation on each block of (4×4) pixels in the macroblock. For example, as shown in FIG. 12, the pixel signals of the pixels lined horizontally are used in the upper portion of blocks 0, 1, 4, and 5 located in the upper end of the macroblock. In blocks 2, 3, 6, 7, 8, 9, 12, 13, 10, 11, 14, and 15, the pixel signals of the blocks adjacent to the upper side of the encoding target image in the macroblock are used. In the blocks 0, 2, 8, and 10 located in the left end of the macroblock, the pixel signals of the left adjacent blocks and the pixel signals (pixel signals of the pixels of an adjacent macroblock) of the left adjacent block are used. In the blocks 1, 3, 9, 11, 4, 6, 12, 14, 5, 7, 13, and 15, the pixel signals of the left adjacent block of the encoding target image in the macroblock are used. In this way, the intra-prediction operation is executed using the pixel signals of the encoding target block and the pixel signals of the block adjacent to the encoding target block in the encoding target image.

In the case of FIG. 12, because of using the pixel signals of the block adjacent to the upper portion of the macroblock and the pixel signals of the encoding target block, it is not necessary to store the pixel signals of the horizontally lined pixels adjacent to the upper portion of the macroblock in the encoding target image. Accordingly, the intra-prediction operation can be executed by reducing the amount of pixel signals stored. Moreover, by using the pixel signals of the encoding target block, the deterioration in the precision can be reduced in comparison with the intra-prediction operation of using only the pixel signals of the encoding target block.

Figure 13:
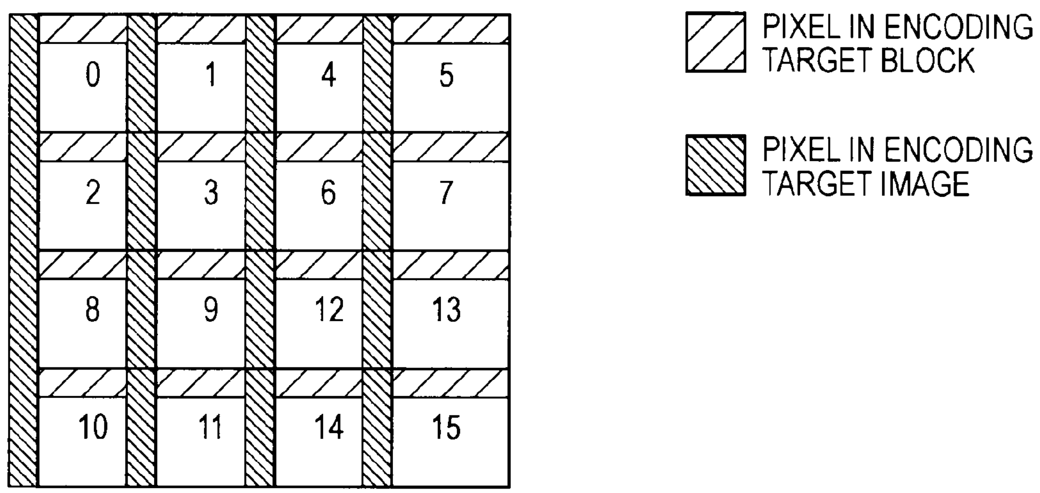
FIG. 13 is a diagram illustrating another intra-prediction operation when the processing order of the macroblocks is horizontal.

When the prediction is generated from the encoded image, as in FIG. 13, the pixel signals of the encoding target image for each block of (4×4) pixels in the macroblock are stored as image signals of the left adjacent block. When the intra-prediction operation of the block of (4×4) pixels is executed using the stored pixel signals and the pixel signals of the encoding target block, the intra-prediction operation can be executed in parallel. Moreover, the intra-prediction operation can be completed in two cycles, as shown in FIG. 8C.

Figure 14:
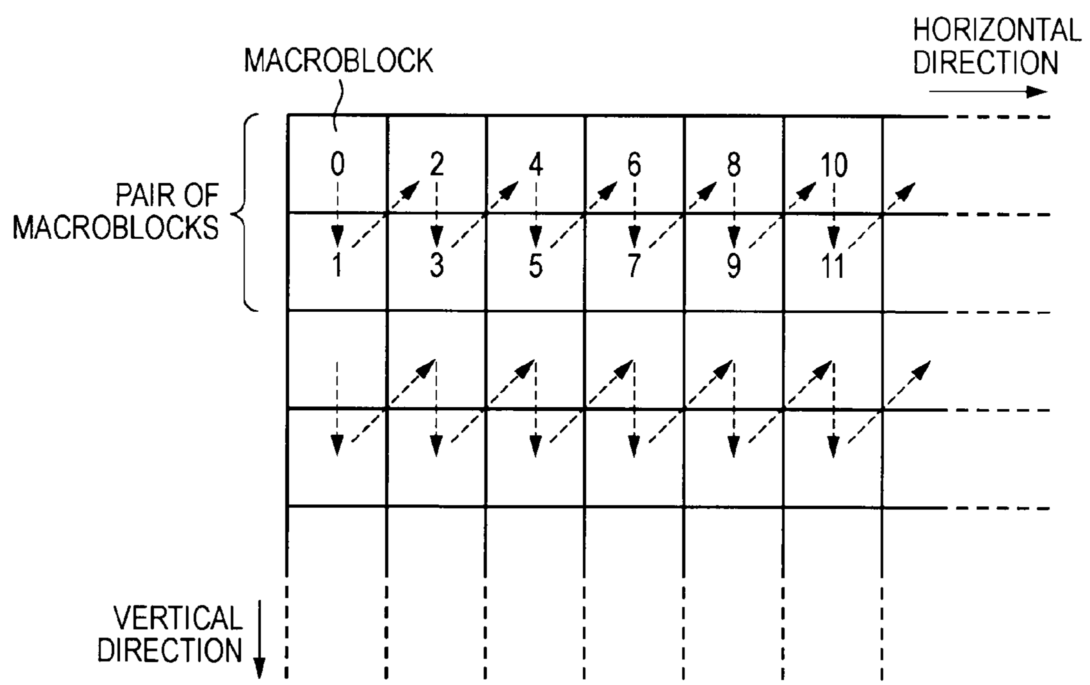
FIG. 14 is a diagram illustrating the intra-prediction operation when the processing order of the macroblocks is vertical.

When the processing order of the macroblock is vertical, the intra-prediction operation is executed using the pixel signals of the pixels lined vertically in the left end of the block and the pixel signals of the pixels lined horizontally in the lower end from the block adjacent to the upper side of the encoding target block in the encoding target image. FIG. 14 is a diagram illustrating the addresses of the macroblocks in an MBAFF (Macro Block Adaptive Frame Field mode. The MBAFF mode is a specific encoding mode of H.264/AVC and a mode in which the intra-encoding operation is executed vertically in a unit of two macroblocks. In the MBAFF mode, two macroblocks are lined vertically and the processing order of the macroblocks is vertical. In this case, the intra-prediction operation is executed using the pixel signals of the pixels lined vertically in the left end of the encoding target block and the pixel signals of the pixels lined horizontally in the lower end from the block adjacent to the upper side of the encoding target block in the encoding target image.

The pixel size of the encoding target block is not limited to the size of (4×4) pixels, but may be a pixel size of (8×8) pixels or a pixel size of (16×16) pixels. By executing the above-described process not only on the luminance component but the color difference component, the intra-prediction operation may be executed with the simple configuration.

9. Case of Executing Image Encoding by Software

The above-described series of processes may be executed by configuration of hardware, software, or combination thereof. When the processes are executed by the software configuration, a program recording a process sequence is installed in a memory of a computer assembled exclusive-use hardware. Alternatively, the program may be installed and executed in a general computer capable of executing various processes.

Figure 15:
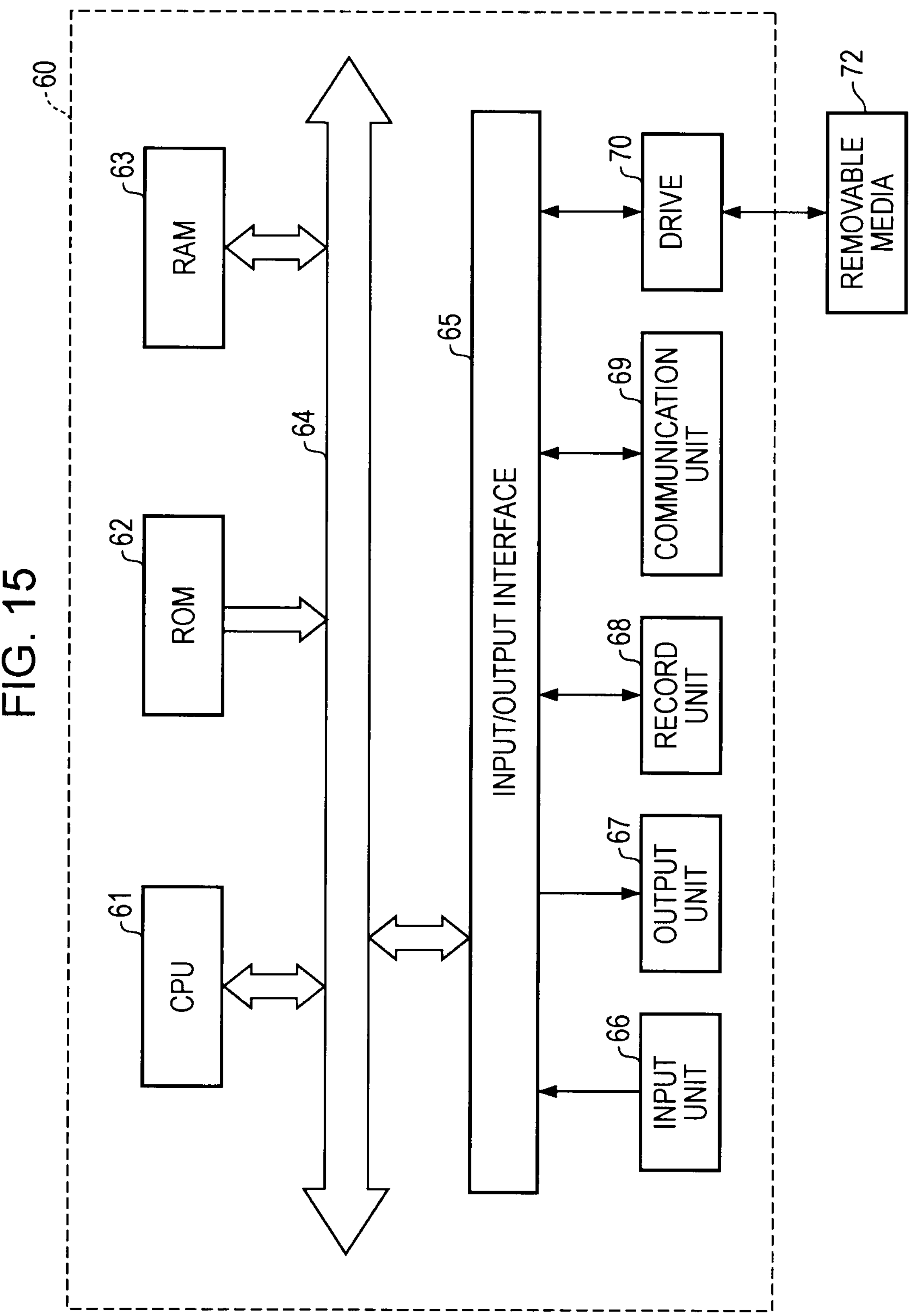
FIG. 15 is a diagram illustrating the configuration of a computer.

FIG. 15 is a diagram illustrating the configuration of a computer executing executes the above-described series of processes by a program. A CPU 61 of a computer 60 executes various processes in accordance with a computer program recorded in a ROM 62 and a recording unit 68.

The RAM 63 appropriately stores computer programs executed in the CPU 61 or data. The CPU 61, the ROM 62, and the RAM 63 are connected to each other via a bus 64.

An input/output interface 65 is connected to the CPU 61 via the bus 64. An input unit 66 such as a touch panel, a keyboard, a mouse, or a microphone and an output unit 67 such as a display are connected to the input/output interface 65. The CPU 61 executes various processes in accordance with instructions input from the input unit 66. The CPU 61 outputs the processing result to the output 67.

The recording unit 68 connected to the input/output interface 65 is a hard disk drive, for example, and records the computer programs executed in the CPU 61 and various kinds of data. The communication unit 69 carries out communication with an external apparatus via a network such as the Internet or the local area network or a wired or wireless communication path such as digital broadcast. The computer 60 acquires a computer program via the communication unit 69 and records the computer program in the ROM 62 or the recording unit 68.

When a removable media 72 such as a magnetic disk, an optical disk, a magnetooptical disk, or a semiconductor memory is mounted, a drive 70 drives the removable media to acquires a computer program, data, or the like recorded temporarily or permanently. The acquired computer program or data is transmitted to the ROM 62, the RAM 63, or the recording unit 68, as necessary.

The CPU 61 reads and executes the computer program executing the above-described series of processes to execute an encoding operation on an image signal recorded in the recording unit 68 or the removable media 72 or an image signal supplied via the communication unit 69.

The embodiment of the invention is construed as being limited to the embodiment set forth herein. The embodiment of the invention discloses an exemplary embodiment of the invention and may be modified or substituted in the scope of the invention without departing from the gist of the invention by those skilled in the art. That is, the gist of the invention is determined in consideration of the appended claims.

The present application contains subject matter related to that disclosed in Japanese Priority Patent Application JP 2009-097826 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image encoding apparatus comprising:

a processor configured to prepare a prediction for each of a plurality of intra-prediction modes of an encoding target block by using at least one of pixel signals of pixels of the encoding target block lined horizontally in an upper end of the encoding target block and pixel signals of pixels of the encoding target block lined vertically in a left end of the encoding target block; and execute an intra-prediction operation of the encoding target block by using an image of the encoding target block in an encoding target image and the prepared prediction, wherein when the preparing step uses pixel signals of the pixels of the encoding target block lined horizontally in the upper end of the encoding target block, the preparing step prepares the prediction by further using pixel signals of pixels lined vertically in a right end of a block adjacent to a left side of the encoding target block in the encoding target image, and when the preparing step uses pixel signals of the pixels of the encoding target block lined vertically in the left end of the encoding target block, the preparing step prepares the prediction by further using pixel signals of pixels lined horizontally in a lower end of a block adjacent to an upper side of the encoding target block in the encoding target image.

2. The image encoding apparatus according to claim 1, wherein depending on a direction of processing order of a macroblock formed by one or more encoding target blocks, the preparing step uses the pixel signals of the pixels of the encoding target block lined horizontally in the upper end of the encoding target block or the pixel signals of the pixels of the encoding target block lined vertically in the left end of the encoding target block.

3. The image encoding apparatus according to claim 2, wherein when the direction of the processing order of the macroblock is horizontal, the preparing step uses the pixel signals of the pixels of the encoding target block lined horizontally in the upper end of the encoding target block in the intra-prediction operation of the encoding target block in the macroblock, and when the direction of the processing order of the macroblock is vertical, the preparing step uses the pixel signals of the pixels of the encoding target block lined vertically in the left end of the encoding target block in the intra-prediction operation of the encoding target block in the macroblock.

4. The image encoding apparatus according to claim 3, wherein when the direction of the processing order of the macroblock is horizontal, the preparing step uses the pixel signals of the pixels of the encoding target block lined horizontally in the upper end of the encoding target block in the intra-prediction operation of the encoding target block in an upper end of the macroblock, and when the direction of the processing order of the macroblock is vertical, the preparing step uses the pixel signals of the pixels of the encoding target block lined vertically in the left end of the encoding target block in the intra-prediction operation of the encoding target block in a left end of the macroblock.

5. The image encoding apparatus according to claim 1, wherein the executing step comprises:

calculating an encoding cost of each intra-prediction mode for the encoding target block by using the encoding target image and an encoded image, and setting a mode with the smallest encoding cost as a selected intra-prediction mode of the encoding target block.

6. The image encoding apparatus according to claim 5, wherein when the preparing step uses one of the pixel signals of the pixels of the encoding target block lined horizontally in the upper end of the encoding target block and the pixel signals of the pixels of the encoding target block lined vertically in the left end of the encoding target block, the preparing step prepares the prediction by using the pixel signals and pixel signals adjacent to the encoding target block in the encoding target image, and the executing step calculates the encoding cost by performing an offset adding operation in accordance with the prediction mode where the pixels of the encoding target block are used.

7. The image encoding apparatus according to claim 1, wherein the intra-prediction operation related to one or more encoding target blocks forming a macroblock is performed in parallel.

8. An image encoding method comprising:

preparing a prediction for each of a plurality of intra-prediction modes of an encoding target block by using at least one of pixel signals of pixels of the encoding target block lined horizontally in an upper end of the encoding target block and pixel signals of pixels of the encoding target block lined vertically in a left end of the encoding target block; and executing an intra-prediction operation of the encoding target block by using an image of the encoding target block in an encoding target image and the prepared prediction, wherein when the preparing step uses the pixel signals of the pixels of the encoding target block lined horizontally in the upper end of the encoding target block, the preparing step prepares the prediction by further using pixel signals of pixels lined vertically in a right end of a block adjacent to a left side of the encoding target block in the encoding target image, and when the preparing step uses the pixel signals of the pixels of the encoding target block lined vertically in the left end of the encoding target block, the preparing step prepares the prediction by further using pixel signals of pixels lined horizontally in a lower end of a block adjacent to an upper side of the encoding target block in the encoding target image.

9. A non-transitory computer readable medium having computer readable instructions thereon that when executed by a computer cause the computer to perform an image encoding method comprising:

preparing a prediction for each of a plurality of intra-prediction modes of an encoding target block by using at least one of pixel signals of pixels of the encoding target block lined horizontally in an upper end of an encoding target block and pixel signals of pixels of the encoding target block lined vertically in a left end of the encoding target block among pixel signals of the encoding target block; and executing an intra-prediction operation of the encoding target block by using an image of the encoding target block in an encoding target image and the prepared prediction wherein when the preparing step uses the pixel signals of the pixels of the encoding target block lined horizontally in the upper end of the encoding target block, the preparing step prepares the prediction by further using pixel signals of pixels lined vertically in a right end of a block adjacent to a left side of the encoding target block in the encoding target image, and when the preparing step uses the pixel signals of the pixels of the encoding target block lined vertically in the left end of the encoding target block, the preparing step prepares the prediction by further using pixel signals of pixels lined horizontally in a lower end of a block adjacent to an upper side of the encoding target block in the encoding target image.

* * * * *